(12) United States Patent
Zabelin

(10) Patent No.: US 12,000,530 B2
(45) Date of Patent: Jun. 4, 2024

(54) FLAT SCREEN DISPLAY HOLDER WITH ADJUSTABLE TILT AND ELEVATION

(71) Applicant: Peter Zabelin, Novato, CA (US)

(72) Inventor: Peter Zabelin, Novato, CA (US)

( * ) Notice: Subject to any disclaimer, the term of this patent is extended or adjusted under 35 U.S.C. 154(b) by 727 days.

(21) Appl. No.: 17/184,589

(22) Filed: Feb. 24, 2021

(65) Prior Publication Data

US 2022/0268401 A1 Aug. 25, 2022

(51) Int. Cl.
*F16M 11/38* (2006.01)
*F16M 11/20* (2006.01)

(52) U.S. Cl.
CPC ......... *F16M 11/38* (2013.01); *F16M 11/2021* (2013.01); *F16M 2200/068* (2013.01)

(58) Field of Classification Search
CPC . A47B 97/08; A47B 2023/049; A47B 23/042; A47B 23/043; A47B 23/044; A47B 2097/005; A47B 2097/006; F16M 11/2021; F16M 11/38; F16M 2200/027; F16M 2200/063; F16M 2200/068; G06F 1/1607
USPC ............ D14/447; D6/656.11; 248/454, 455, 248/457, 460, 462, 317, 453
See application file for complete search history.

(56) References Cited

U.S. PATENT DOCUMENTS

| | | | |
|---|---|---|---|
| 3,006,107 A | 10/1961 | Tolegian | |
| 3,799,488 A * | 3/1974 | Sena | A47B 97/08 248/452 |
| 4,403,761 A * | 9/1983 | Jamar | G09F 7/18 248/222.51 |
| 5,165,634 A * | 11/1992 | Garbuzov | F16M 11/38 84/327 |
| 6,000,663 A * | 12/1999 | Plasse | A01G 5/02 248/447 |
| 7,213,794 B1 * | 5/2007 | Jefferies | A47B 23/044 248/458 |
| 8,205,561 B1 * | 6/2012 | Bierworth | A61G 5/1094 108/157.11 |
| 8,328,153 B2 * | 12/2012 | Yang | F16M 11/38 248/370 |

(Continued)

OTHER PUBLICATIONS

"GO-2542 Rolling Folding TV Cart", author and original publication date unknown, from Internet web page at address https://www.gomatzwa.com/product/living-room/tv-stand/go-2542-rolling-folding-tv-cart-.

(Continued)

*Primary Examiner* — Jonathan Liu
*Assistant Examiner* — Guang H Guan
(74) *Attorney, Agent, or Firm* — GSS Law Group; Gregory S. Smith; Phillip M. Wagner

(57) ABSTRACT

A display support frame configurable as a free-standing device holds many different sizes of flat screen displays. The display support frame includes a base frame to be placed against a surface such as a desk, floor, or wall, two elevation arms rotatably coupled to the back end of the base frame, and a tilt frame rotatably coupled to the front end of each elevation arm. A flat screen display may be attached to the tilt frame. An elevation angle between the elevation arms and base frame and a tilt angle between the tilt frame and elevation arms are independently adjustable. After removing the flat screen display, the display support frame folds into a flat pack for convenient storage and transport. The display support frame may be placed in deployed and flat pack configurations without the use of tools.

18 Claims, 17 Drawing Sheets

(56) References Cited

U.S. PATENT DOCUMENTS

| | | | |
|---|---|---|---|
| 8,464,995 B2* | 6/2013 | Yang | F16M 13/00 |
| | | | 248/455 |
| 9,055,814 B2 | 6/2015 | Whalen et al. | |
| 9,062,823 B2* | 6/2015 | Pan | F16M 13/00 |
| 10,463,152 B1 | 11/2019 | Day | |
| D953,340 S * | 5/2022 | Huang | D14/447 |
| 11,499,668 B2* | 11/2022 | Cooper | F16M 11/2021 |
| 2008/0251659 A1* | 10/2008 | Matias | A47B 23/044 |
| | | | 248/166 |
| 2009/0289166 A1* | 11/2009 | Hopfer | A47B 23/043 |
| | | | 248/456 |
| 2011/0079687 A1 | 4/2011 | Grove | |
| 2014/0252189 A1* | 9/2014 | Kifer | F16M 11/10 |
| | | | 248/299.1 |
| 2022/0268401 A1* | 8/2022 | Zabelin | F16M 11/2021 |

OTHER PUBLICATIONS

"Single Adjustable LCD Monitor Stand Folding VESA", author and original publication date unknown, from internet web page at address https://www.amazon.com/Adjustable-Monitor-Folding-75x75mm-100x100mm.

"75×75mm M3 VESA mount", author and original publication date unknown, from Intenet web page at address https://imal.com/products/High-Quality-Vesa-mount-smart-Monitor-Pad-Support-Stand.

* cited by examiner

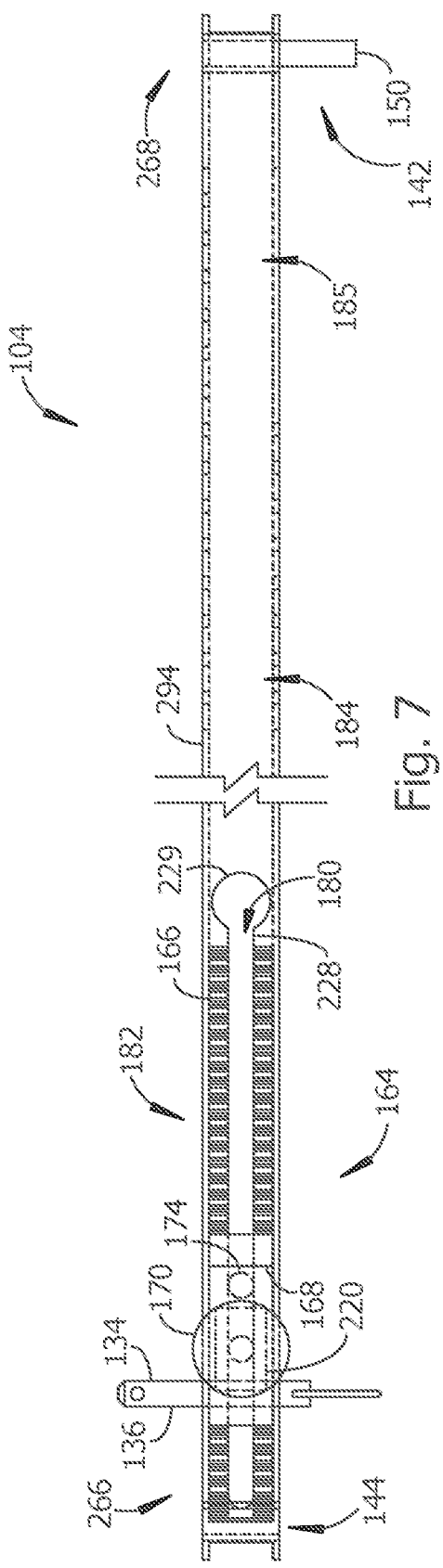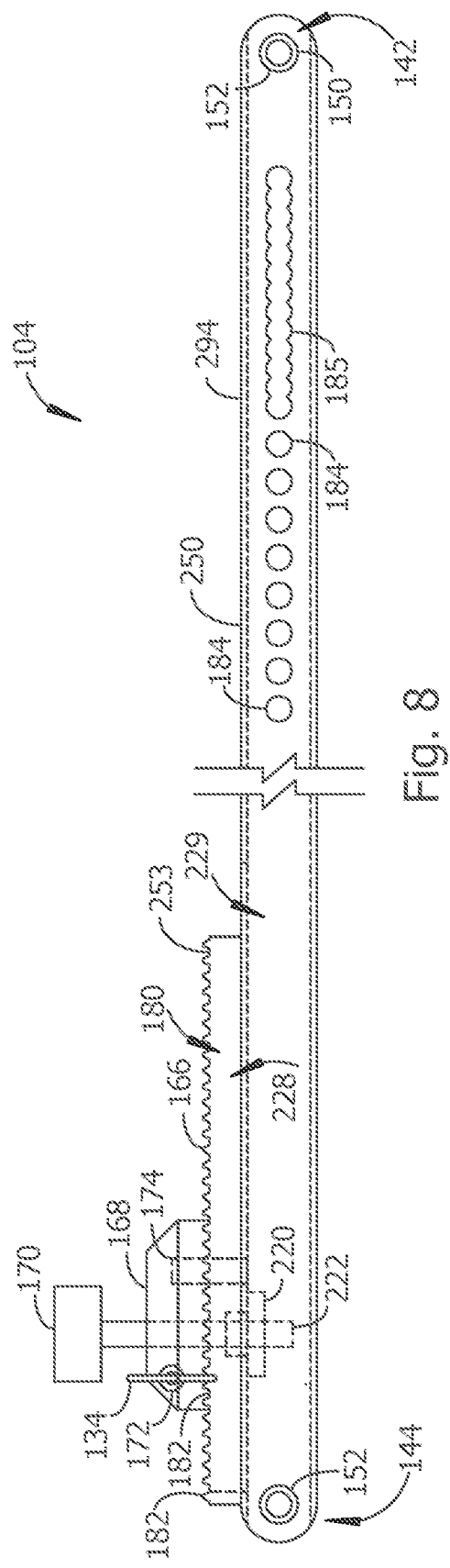

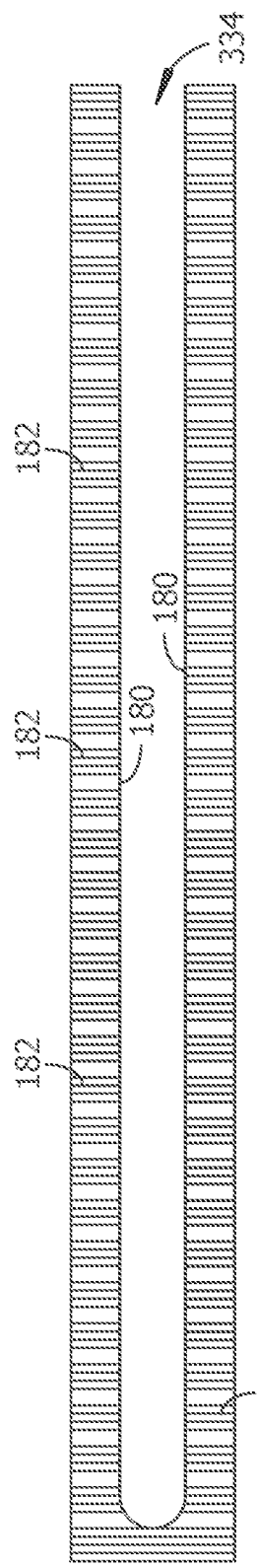
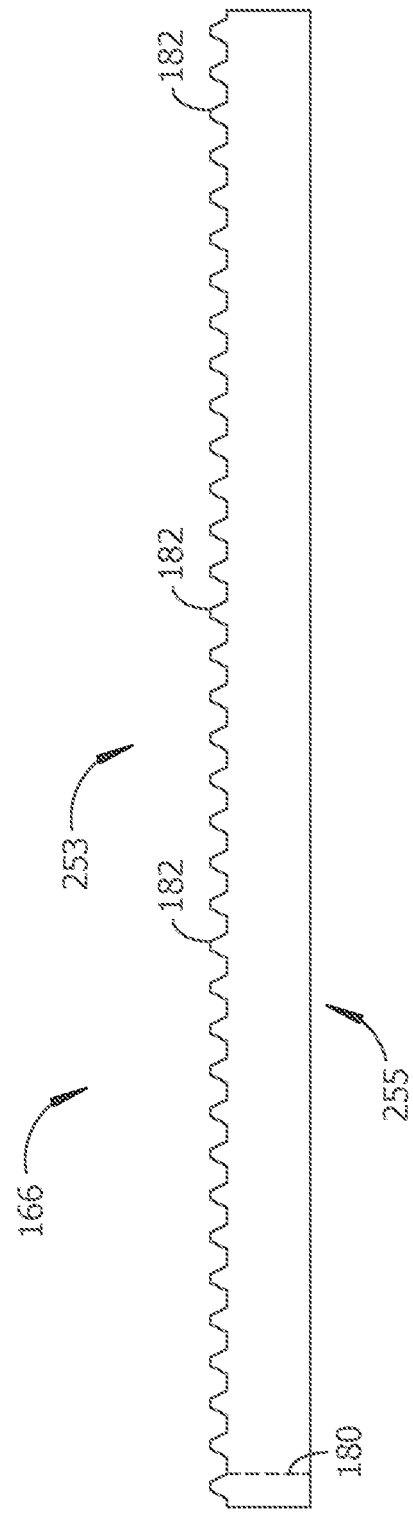

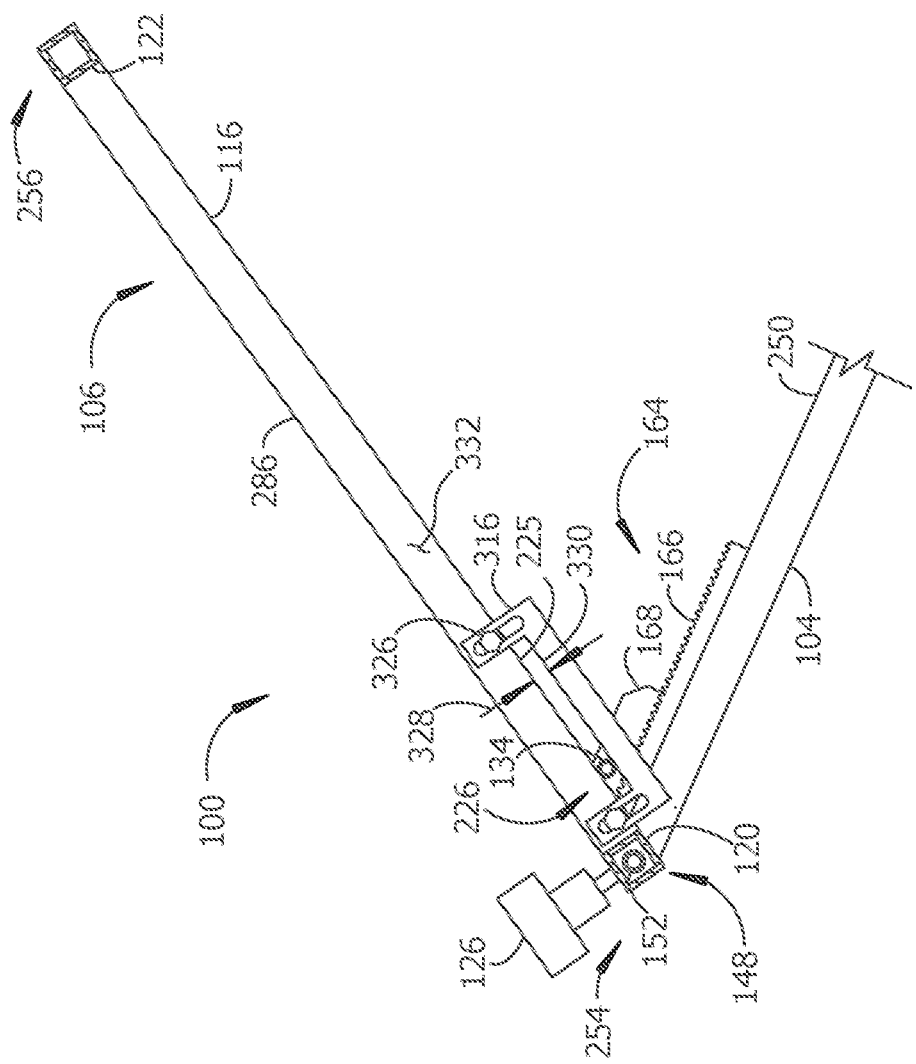

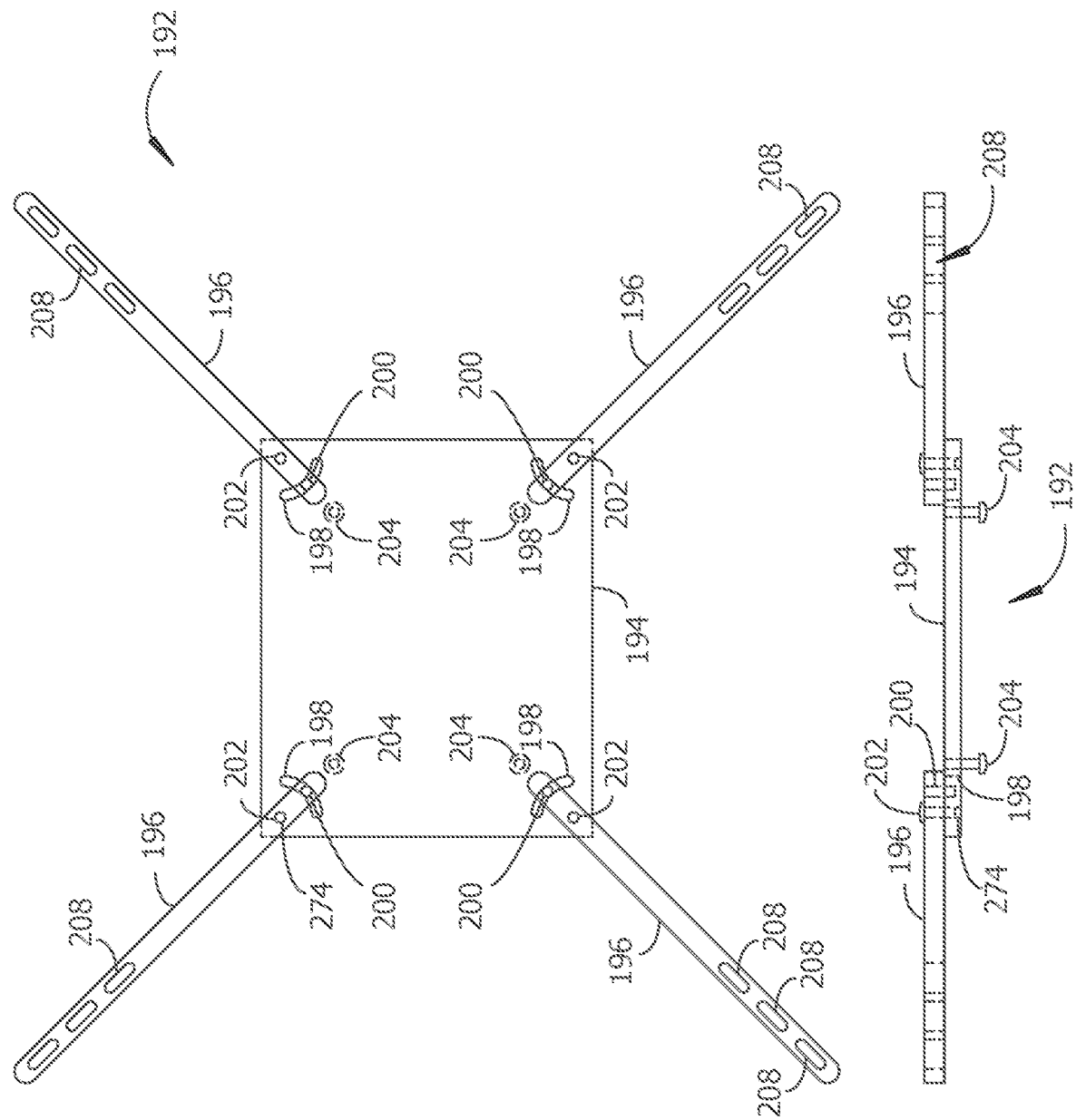

FLAT SCREEN DISPLAY HOLDER WITH ADJUSTABLE TILT AND ELEVATION

FIELD OF THE INVENTION

Embodiments are related to brackets, carts, wall mounts, easels, and stands for holding flat screen displays such as televisions and computer monitors.

BACKGROUND

Flat screen displays are often used at conferences, business meetings, and trade shows to supplement or replace printed media such as signs, posters, banners, photographs, printed booth backdrops, and the like. It may be necessary to quickly set up one or more flat screen displays before an event begins and quickly remove the displays after the event ends. The viewing height and tilt angle of each display may need to be adjusted to improve legibility of displayed information and direct light reflected from display surfaces away from preferred lines of sight.

Flat screen displays may be provided with threaded mounting holes for receiving threaded fasteners such as bolts or screws used to attach the displays to support structures. Many flat screen displays have four tapped holes with separation distances and thread sizes in accord with specifications such as FDMI (Flat Display Mounting Interface) or VESA (Video Electronics Standards Association). For example, plates or brackets may be attached with threaded fasteners to the VESA holes on the monitor, and the plates or brackets attached to a support frame referred to as a wall mount. The wall mount is preferably strongly attached to a wall, easel, or other strong and stable support structure. Some brackets have slots or clamps that engage flanges formed on a wall mount, enabling the display and brackets to be attached to and removed from a wall mount with the brackets remaining attached to the monitor. Some VESA wall mounts have brackets and a wall mounting frame formed as an integrated structure not intended to be disassembled. FDMI and VESA wall mounts have been adapted to attach flat screen displays to mobile and stationary equipment racks, swing arms, kiosks, easels, tripods, carts, trusses for lighting systems, and pipe frames.

Previously available equipment for holding flat screen displays may present problems when displays are to be relocated frequently or set up for temporary installations. A wall or other suitably strong and stable structure may not be available for attachment of a VESA wall mount at a preferred display location. Brackets supplied with some wall mounts may not be mechanically configured for attachment to other wall mounts. Brackets and wall mounting plates may be heavy and bulky, especially for large flat screen displays. Brackets suitable for supporting a small flat screen display may not be suitable for supporting a larger display. It may be necessary to remove brackets from a display to store the display or mount the display to another support structure. Finding space to store support structures, wall mounts, and other VESA mounting components may be difficult in crowded workplaces or public venues such as conference centers.

It may be difficult to adapt mounting components intended for kiosk, wall mount, or overhead display positioning to tabletop or floor display positions. Tabletop stands provided with some flat screen displays may lack durability for displays that are moved frequently. Some stands are not suitable for locations where a person may inadvertently bump into the stand or display, possibly resulting in the stand and flat screen display toppling over or the display being knocked from the stand.

Assembling and disassembling support structures and VESA mounts generally requires the use of hand tools such as screwdrivers, wrenches, and the like. In some venues, such as theaters, auditoriums for trade shows, and conference centers, only authorized personnel may be permitted to perform mechanical and electrical assembly and disassembly work. Substantial time and/or labor expense may be associated with assembling, moving, and disassembling support structures and for attaching and removing VESA mounting components to flat screen displays and support structures.

SUMMARY

An apparatus embodiment of a display support frame includes a base frame; a tilt frame; a first elevation arm including a tilt frame rest; a second elevation arm; a lower right rotatable joint rotatably coupling a back end of the first elevation arm to the base frame; an upper right rotatable joint rotatably coupling a front end of the first elevation arm to a lower end of the tilt frame; a lower left rotatable joint rotatably coupling a back end of the second elevation arm to the base frame; and an upper left rotatable joint rotatably coupling a front end of the second elevation arm to the tilt frame lower end. Another of the tilt frame rest may optionally be attached the second elevation arm.

The base frame includes a left base frame member, a right base frame member, a front transverse base frame member joined to the left base frame member and the right base frame member, and a rear transverse base frame member joined to the left base frame member and the right base frame member. The lower right rotatable joint is attached to the right base frame member near the rear transverse base frame member and the lower left rotatable joint is attached to the left base frame member near the rear transverse base frame member. The base frame optionally includes a first extendable leg slidably engaged with the left base frame member at the base frame front end; and a second extendable leg slidably engaged with the right base frame member at the base frame front end, wherein the left base frame member and the right base frame member are formed as hollow tubes.

The tilt frame rest includes a clamp base formed with an elongate aperture and a plurality of a transverse ridge formed on a top side of the clamp base; a clamp block formed with a plurality of the transverse ridge on a bottom side of the clamp block; a clamp knob aperture extending from a top side of the clamp block to the bottom side of the clamp block; a transverse pin aperture; a guide pin attached to the clamp block, with the guide pin extending outward from the bottom side of said clamp block, and the guide pin positioned to engage the elongate aperture in the clamp base. The tilt frame reset further includes a frame adjustment pin slidably engaged with the transverse pin aperture, with an end of said frame adjustment pin extending transversely toward the tilt frame; and a clamp knob passing through the clamp knob aperture, through the elongate aperture in the clamp base, and engaged with a nut positioned beneath the clamp base. The clamp block is positionable along the clamp base with the plurality of transverse ridges on the clamp base engaged with the plurality of transverse ridges on the clamp block.

The tilt frame includes an upper transverse tilt frame member, a left tilt frame member joined to an end of the upper transverse tilt frame member, a right tilt frame member joined to an opposite end of the upper transverse tilt frame member, and a lower transverse tilt frame member joined to the left tilt frame member and the right tilt frame member. The upper right rotatable joint couples to the right tilt frame member near the lower transverse tilt frame member and the upper left rotatable joint couples to the left tilt frame member near the lower transverse tilt frame member. Two of a display support post are threadably engaged with the lower transverse tilt frame member. The tilt frame further includes a display support member attached to the upper transverse tilt frame member and the lower transverse tilt frame member.

A stowed position of the display support frame includes the first and second elevation arms rotated parallel to the base frame, the tilt frame rotated parallel to the first and second elevation arms, and a frame adjustment pin passing through a pin aperture formed in the base frame, an elevation adjustment aperture formed in the first elevation arm, and a stowing aperture formed in said tilt frame. The stowed position may alternately be referred to as a flat pack.

BRIEF DESCRIPTION OF THE DRAWINGS

FIG. 7 shows a view toward a top side of an example elevation arm.

FIG. 8 shows a view toward a right side of the example elevation arm of FIG. 7.

FIG. 9 is a view toward the top side of an example clamp base included with an adjustable tilt frame rest attached to the elevation arm of FIGS. 7-8.

FIG. 10 is a side view of the example clamp base of FIG. 9.

FIG. 20 is a partial side view toward the inboard surface of the left tilt frame member and left elevation arm, showing an example of a tilt frame safety bracket slidably attached to the tilt frame member and the frame adjustment pin extending through a pin slot formed between the tilt frame safety bracket and the back edge of the tilt frame.

FIG. 25 is a view toward a front side of an example quick-connect adapter for rapid and secure connection of a flat screen display to the display support frame.

FIG. 26 is a view toward a side of the example quick-connect adapter of FIG. 25.

DESCRIPTION

Figure 1:
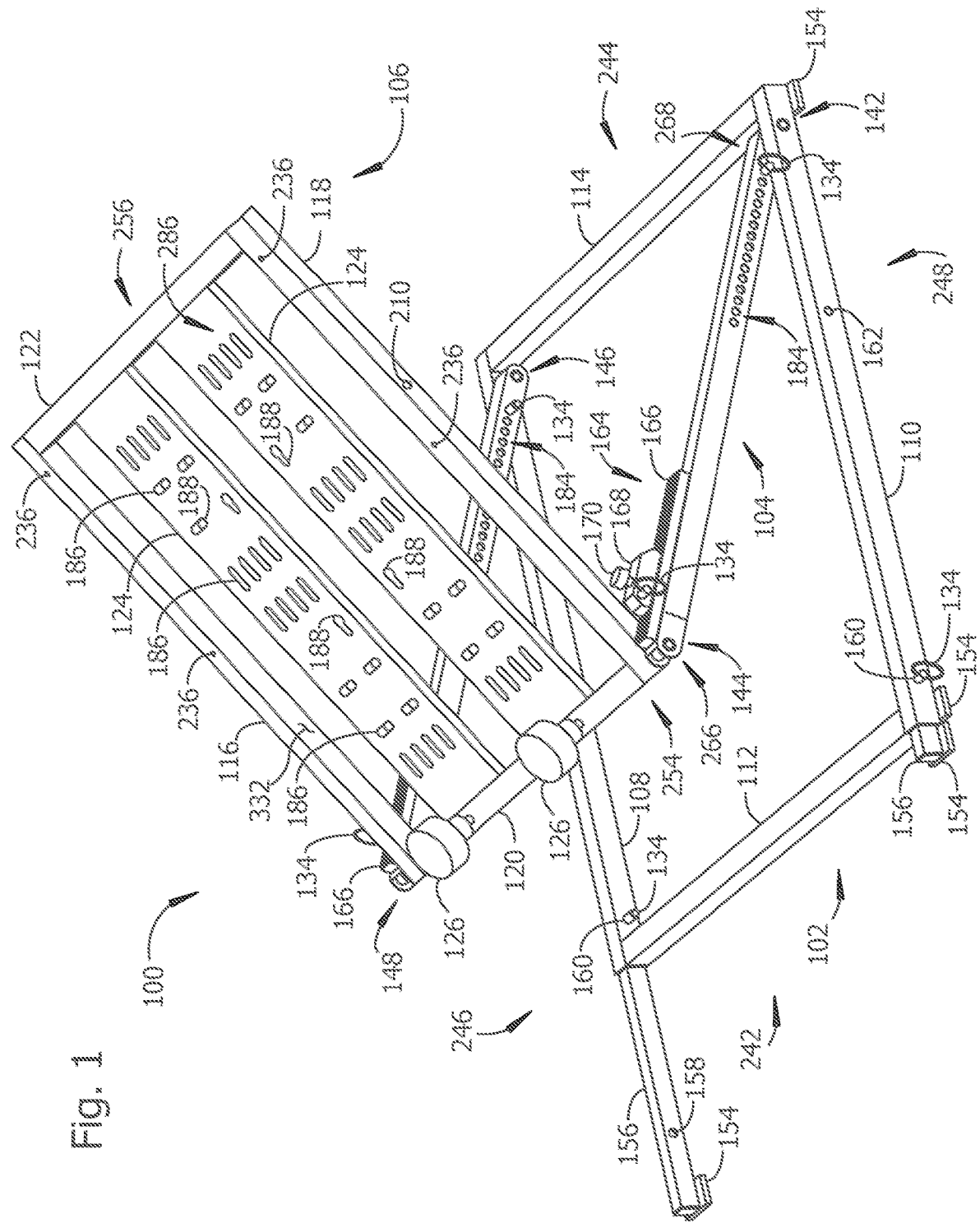
FIG. 1 is a pictorial view toward the front and right sides of an example display support frame embodiment in a deployed configuration.

The disclosed example embodiments of a display support frame provide stable, secure, and adjustable positioning for flat screen displays of many different sizes. A tilt angle and display height of a flat screen display on the display support frame may be adjusted quickly and easily without the use of tools to place the flat screen display in a preferred viewing position. Embodiments of the display support frame are compatible with flat screen displays having mounting apertures arranged in accord with VESA and FDMI specifications, but are also effective for supporting flat screen displays that are not compliant with VESA and FDMI specifications. When not being used to hold a flat screen display, a display support frame may be quickly and easily folded into a flat pack for convenient storage and transport. Skilled assembly labor is not required to deploy a display support frame for holding a flat screen display, attach a flat screen display to the display support frame, remove the flat screen display from the display support frame, and fold the display support frame into a flat pack for convenient transport and storage.

A display support frame includes a tilt frame coupled to a base frame by intervening elevation arms. Rotatable joints connect the elevation arms to the base frame and tilt frame. The tilt frame is configured to hold a flat screen display at a tilt angle established by the tilt frame resting against a pin extending outward from an adjustable tilt frame rest attached to an elevation arm. An elevation angle between an elevation arm and the base frame may be set to establish a preferred separation distance from a reference surface such as a floor or desktop, and to modify a viewing angle to a flat screen display on the display support frame. The elevation angle and tilt angle of the display support frame are adjustable independently of one another. The display support frame may be folded into a flat pack configuration convenient for storage by rotating the tilt frame until it is parallel with the elevation arms and rotating the elevation arms until they are parallel to the sides of the base frame. Removable frame adjustment pins passing through apertures formed in support members lock the display support frame into selected configurations of the tilt frame and elevation arms.

A display support frame may safely be used as a free-standing holder for a flat screen display, without attaching the display support frame to a wall, kiosk, post, beam, truss, or other fixed support structure. Unlike many previously known display mounting devices, the example embodiments of a display support frame are advantageous for positioning flat screen displays on a low surface such as a floor or tabletop. The display support frame is particularly effective for adjusting the tilt angle of a flat screen display to avoid directing light reflections along preferred lines of sight for persons who are seated and for persons who are standing. A display support frame may safely be used to hold flat panels displays that are substantially larger than the display support frame.

The arrangement of structural members and rotatable joints forming an embodiment of a display support frame are readily adaptable to manufacturing display support frames suitable for small displays such as tablet computers and display support frames suitable for large flat screen displays such as those used in some video conference facilities and home theaters. Examples of flat screen displays suitable for use with the disclosed embodiments of a display support frame include, but are not limited to, televisions, computer monitors, video monitors, laptop computers, tablet computers, and "all-in-one" desktop computers with a display and other computer components integrated into one enclosure.

Features of an example embodiment of a display support frame 100 are described in FIGS. 1-27. FIG. 1 shows an example of a display support frame 100 in one of many possible deployed configurations. FIGS. 2-23 show examples of components included in the display support frame 100 of FIG. 1 and more examples of deployed and stowed configurations of the display support frame. FIGS. 24-27 show examples of optional display mounting components for quickly attaching a flat screen display to the display support frame 100.

As shown in FIG. 1, the example display support frame 100 includes a base frame 102, a tilt frame 106, a first elevation arm 104 rotatably coupled to the tilt frame and base frame, and an optional second elevation arm 104 rotatably coupled to the tilt frame and base frame. A display support frame configured to hold a small flat screen display may omit the second elevation arm 104. A lower right rotatable joint 142 couples the back end 268 of the first elevation arm 104 to the base frame 102 near the back end 244 of the base frame. A lower left rotatable joint 146 couples the back end of the second elevation arm to the base frame near the back end of the base frame. An upper right rotatable joint 144 couples the front end 266 of the first elevation arm 104 to the tilt frame 102 near the tilt frame lower end 254. An upper left rotatable joint 148 couples the front end of the second elevation arm to the tilt frame near the tilt frame lower end, on a side of the tilt frame laterally opposite the upper right rotatable joint 144.

The base frame 102 is preferably formed as an open framework from hollow tubes to reduce weight. The base frame includes a left base frame member 108 extending in a longitudinal direction from the front end 242 of the base frame to the back end 244 of the base frame. A right base frame member 110 extends longitudinally from the front end 242 to the back end 244. A front transverse base frame member 112 is joined to the left base frame member and right base frame member near the front end 242 of the base frame. A rear transverse base frame member 114 is joined to the left base frame member 108 and the right base frame member 110 near the back end 244 of the base frame.

An optional extendable leg 156 slidably engages with the hollow interior of the left base frame member 108. Another optional extendable leg similarly engages with the right base frame member 110. In the example of FIG. 1, a first extendable leg 156 extends outward from the front end of the left base frame member 108 on the left side 246 of the base frame and a second extendable leg is shown in an example of a retracted position in the right base frame member 110 on the right side 248 of the base frame. Each of the extendable legs 156 is formed with at least two transverse leg apertures 158, a first transverse leg aperture (not visible in the figure) to be aligned with a corresponding pin aperture 160 in the base frame for the extended leg position and a second transverse leg aperture 158 to be aligned with the pin aperture 160 for the retracted leg position. A frame adjustment pin 134 passing through the aligned leg aperture 158 and pin aperture 160 holds an extendable leg in either the extended position or retracted position. Although the extendable legs are independently adjustable, both extendable legs would ordinarily be extended together or retracted together.

At least one of the elevation arms 104 includes a tilt frame rest 164 for adjusting a tilt angle of the tilt frame 106 relative to the elevation arm. An embodiment 100 optionally includes a separate tilt frame rest 164 for each elevation arm 104. As will be shown in more detail in subsequent figures, each tilt frame rest 164 in the example of FIG. 1 includes a clamp block 168 held to a clamp base 166 by a clamp knob 170 engaged with a nut slidably positioned inside the elevation arm. A transverse dimension of the nut inside the elevation arm is preferably sufficiently large to prevent the nut rotating when the clamp knob is turned. Tightening the clamp knob secures the clamp block to the clamp base. Loosening the clamp knob enables the clamp block to be separated from the clamp base and moved longitudinally along the clamp base toward the front end of the elevation arms or toward the back end of the elevation arms.

When the display support frame 100 is deployed for holding a flat screen display, the tilt frame rests against a frame adjustment pin 134 passing through a transverse pin aperture formed in the clamp block. Positioning the clamp block closer to the front end of the clamp base increases a tilt angle of the tilt frame relative to the elevation arm. Positioning the clamp black closer to a back end of the clamp base decreases the tilt angle. Adjusting a position of a clamp block on a clamp base and rotating the tilt frame about the upper right rotatable joint 144 and upper left rotatable joint 148 until the tilt frame rests against the shank of the frame adjustment pin extending from the clamp block establishes a selected tilt angle between the tilt frame and elevation arm.

The elevation arms 104 are formed with a set of elevation adjustment apertures 184 passing transversely through each elevation arm near the back end 268 of the elevation arms. The elevation arms may be rotated about the lower right rotatable joint 142 and lower left rotatable joint 146 to raise the elevation arms above the base frame or stow the elevation arms parallel to the left and right sides of the base frame. Passing a frame adjustment pin 134 through a selected one of the elevation adjustment apertures 184 and resting the shank of the pin against a top side 251 of the base frame 102 establishes an elevation angle between the elevation arm and base frame. Passing the frame adjustment pin through an elevation adjustment aperture close to the back end 268 of the elevation arm 104 increases the elevation angle between the elevation arm and base frame. Repositioning the frame adjustment pin to an elevation adjustment aperture closer to the front end 266 of the elevation arm decreases the elevation angle. Changing the elevation angle raises or lowers the tilt frame and any flat screen display on the tilt frame.

The tilt frame 106 in the example of FIG. 1 is preferably formed as an open framework from hollow tubes to reduce weight. The tilt frame 106 includes a left tilt frame member 116 extending in a longitudinal direction from the lower end 254 of the tilt frame to the upper end 256 of the tilt frame, where "upper" and "lower" reflect the relative positions of the ends of the tilt frame in the example of FIG. 1. A right tilt frame member 118 also extends from the lower end 254 to the upper end 256. A lower transverse tilt frame member 120 is joined to the left tilt frame member and right tilt frame member 118 near the lower end 254 of the tilt frame. An upper tilt frame member 122 is joined to the left tilt frame member and right tilt frame member near the upper end 256.

The example tilt frame 106 in FIG. 1 further includes two display support posts 126 threadably engaged with the lower transverse tilt frame member 120. For some tilt angles and some sizes of flat screen displays, the lower edge of a flat screen display may optionally be rested against the display support posts and the front side 286 of the tilt frame without attaching the flat screen display to the display support frame 100 with threaded fasteners.

For some installations it will be preferable to attach a flat screen display to the display support frame 100 to prevent the display from being accidentally knocked off the display support frame. Attaching a flat screen display to the display support frame 100 may also be preferred when the tilt frame is set to a large tilt angle or the base frame placed against a surface that is not horizontal. The example tilt frame 106 in FIG. 1 therefore includes one, and optionally more than one, display support member 124 to which a flat screen display can be attached by threaded fasteners such as bolts or screws passing through apertures in the display support member to engage threaded apertures on the flat screen display.

The display support member 124 in the example of FIG. 1 extends from the lower transverse frame member 120 to the upper transverse frame member 122. Alternatively, the display support member 124 extends from the left tilt frame member 116 to the right tilt frame member 118. The display support member is preferably formed with many apertures 186 positioned to accommodate flat screen displays of different sizes and shapes having threaded mounting holes. Some apertures 186 are positioned to allow a second flat screen display to be attached to the display support frame 100 and to align with mounting holes on equipment that is not VESA-compliant. Some apertures 186 are optionally provided to allow more than one VESA mounting plate to attach to the tilt frame. Some apertures 186 are optionally provided to enable attachment of VESA wall mounting plates of different sizes. The tilt frame 106 optionally includes two or more apertures 236 positioned to accept fasteners passing through a VESA wall mount attached to the front side 286 of the tilt frame.

Figure 2:
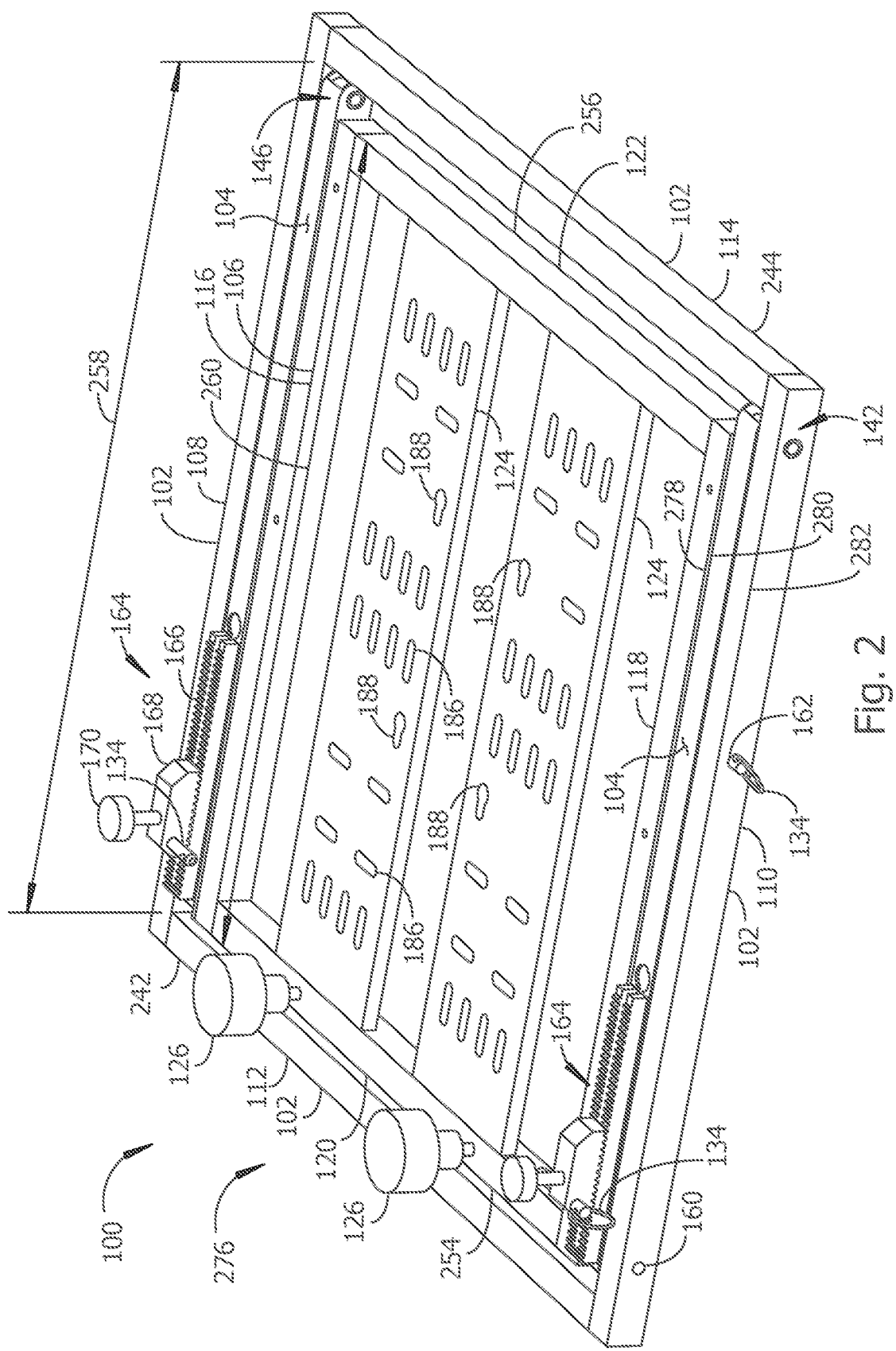
FIG. 2 is a pictorial view of the display support frame of FIG. 1, showing an example of the display support frame folded into a flat pack configuration.

FIG. 1 illustrates an example of a deployed position of the support frame 100, with the tilt frame and other components in example positions for supporting a flat screen display against the tilt frame. FIG. 2 shows the display support frame of FIG. 1 in an example of stowed or folded configuration referred to herein as a flat pack 276. The flat pack configuration of the display support frame is advantageous for storing and transporting the display support frame.

Figure 24:
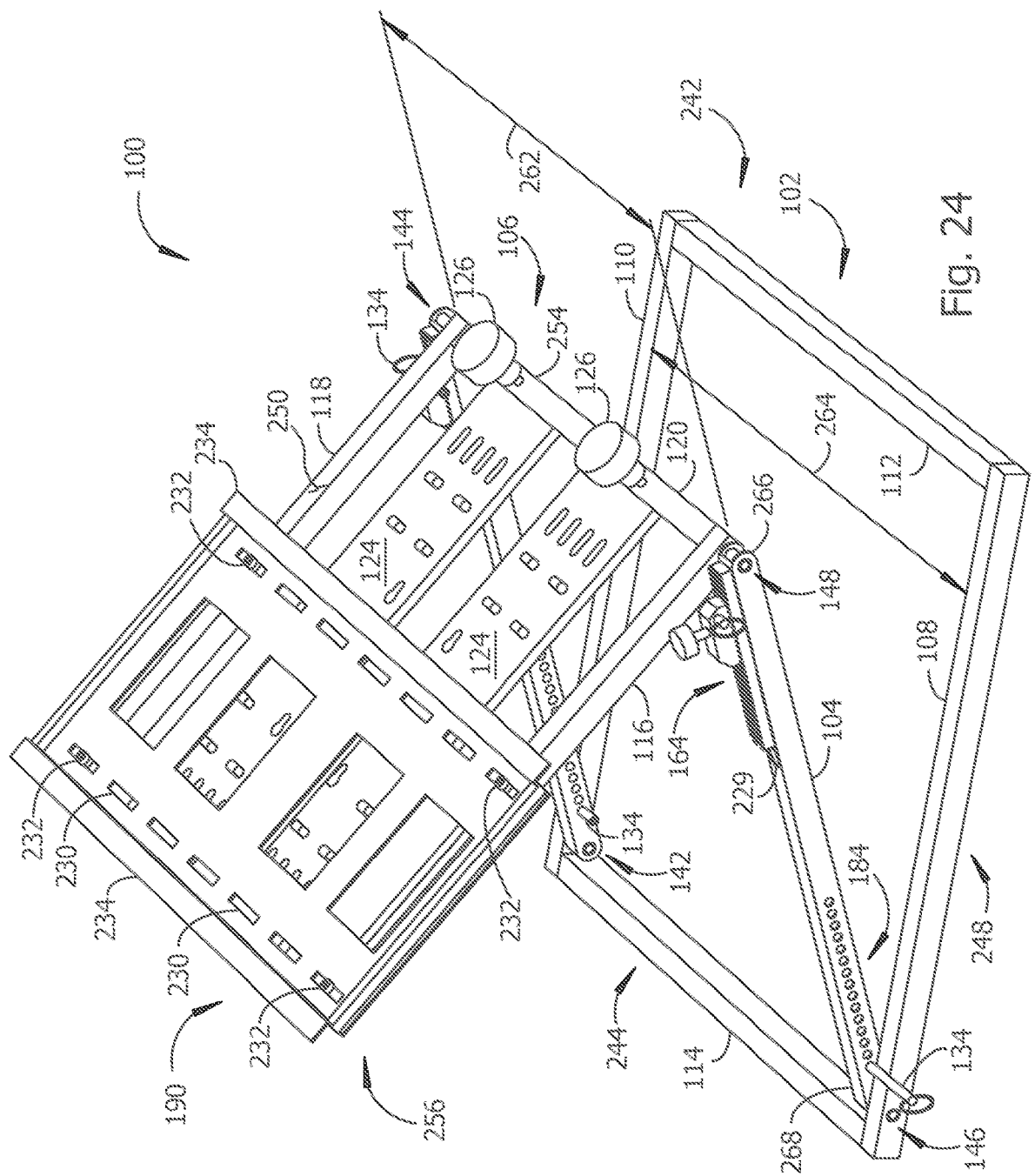
FIG. 24 is a pictorial view toward the front and left sides of the example display support frame of the preceding figures, illustrating an example of a VESA wall mount attached to the tilt frame.

As suggested in the example of FIG. 2, the tilt frame 106 may be rotated about the upper right rotatable joint 144 and upper left rotatable joint 148 until a longitudinal edge 278 of the tilt frame is approximately parallel to a longitudinal edge 280 of the elevation arm 104. The elevation arm and tilt frame may then be rotated together about the lower right rotatable joint 142 and lower left rotatable joint 146 until the longitudinal edge 280 of the elevation arm 104 is parallel to a longitudinal edge 282 of the base frame 102. A stowing aperture 210 may be positioned on the tilt frame to align with one of the elevation apertures 184 and a pin aperture 162 formed in the base frame, and a frame adjustment pin passed through the aligned apertures to hold the folded display support frame in the flat pack configuration 276. For the display support frame 100 to be placed in the flat pack configuration shown in the example of FIG. 2, the interior longitudinal dimension 258 of the base frame will preferably be greater than the exterior longitudinal dimension 260 of the tilt frame and the interior transverse dimension 264 of the base frame will be greater than the exterior transverse dimension 262 of the tilt frame (ref. FIG. 24).

In the example of FIG. 2, the display support posts 126, clamp blocks 168, and clamp knobs 170 are shown in their relative positions after the deployed position of FIG. 1 is folded to the flat pack configuration. The base frame 102 may optionally be formed with stowage apertures for attachment of clamp blocks by frame adjustment pins and display support posts and clamp knobs by engagement with threaded holes. Display support posts 126 may also be removed from their example deployed positions in FIGS. 1-2 to attached to stowage apertures formed in the base frame. Moving clamp blocks, clamp knobs, and display support posts from their operational positions to stowed positions on the base frame reduces the overall thickness of the flat pack and keeps all parts neatly organized for transport and storage.

Figure 3:
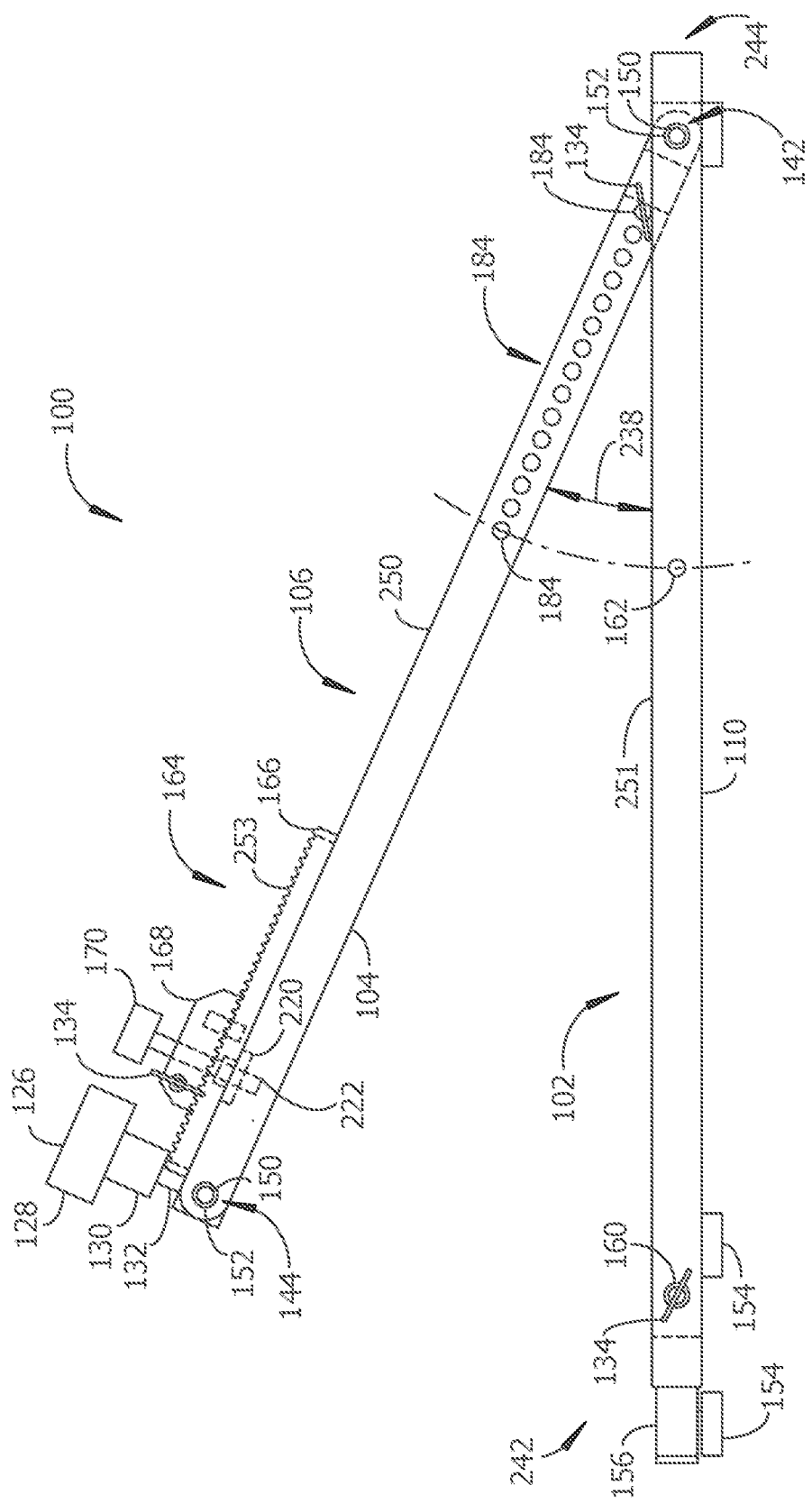
FIG. 3 is a view toward a left side of the display support frame of FIG. 1, showing an example of the display support frame partly unfolded with elevation arms rotated to a selected elevation angle from a base frame.

FIGS. 2-6 illustrate an example sequence of steps for setting a flat screen display to a selected viewing angle at a selected separation distance from a reference surface such as a floor or desktop. The example deployment sequence starts from the example flat pack configuration 276 of FIG. 2. FIG. 3 shows an example of the elevation arms 104 raised to a selected elevation angle 238 by rotating the elevation arms about the lower right and lower left rotatable joints. Each of the rotatable joints (142, 144, 146, 148) may be implemented as a central pin 150 attached to one of the support members, with the pin rotatably engaging an aperture in a cylindrical bushing 152 inserted in a transverse aperture formed in the adjacent support member. The elevation arms are held at the selected elevation angle 238 by passing a frame adjustment pin 134 through a transverse elevation adjustment aperture 184 and allowing the shank of the pin to rest on a top side 251 of the base frame 102. The weight of the elevation arms and tilt frame hold the frame adjustment pin firmly against the base frame, preventing downward displacement of the elevation arm relative to the base frame.

Figure 4:
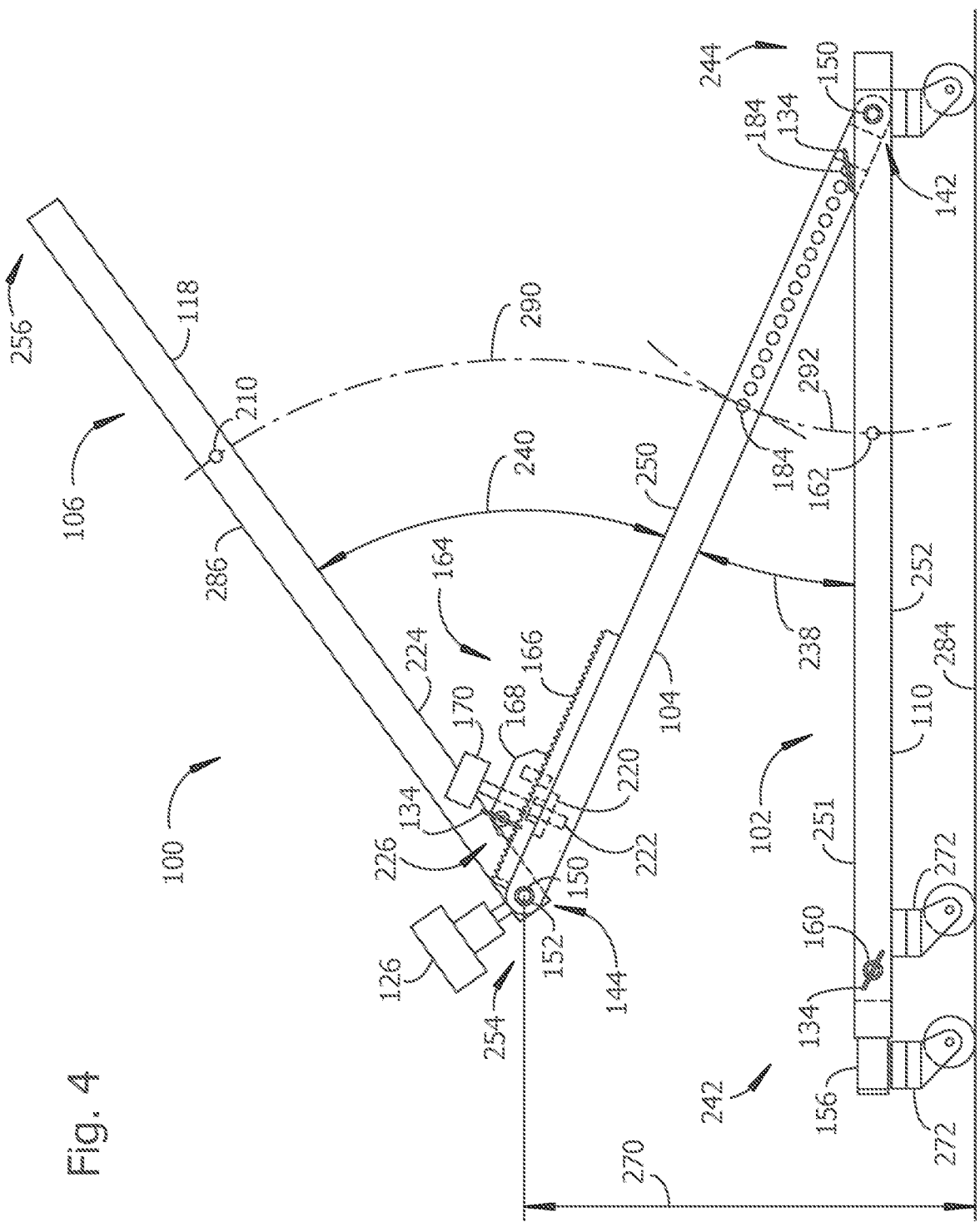
FIG. 4 is a view toward the left side of the display support frame of FIGS. 1-3, showing an example of the display support frame unfolded with the elevation arms raised as in FIG. 3, a tilt frame rotated to a selected tilt angle from the elevation arms, and the extendable legs in an example of a stowed position inside the base frame.

Continuing the example deployment sequence of FIGS. 2 and 3, FIG. 4 shows an example of the elevation arm at the selected elevation angle 238, further illustrating an example of the tilt frame 106 rotated away from the top side 250 of the elevation arm to a selected tilt angle 240. The example tilt angle 240 is set by adjusting the tilt frame rest 164 such that the clamp block 168 positions the frame adjustment pin 134 for contact 226 between the shank of the pin and the back surface 224 of the corresponding tilt frame member (116, 118) with the tilt frame 106 rotated to the selected tilt angle. When the clamp block has been moved to the position on the clamp base needed to establish the preferred tilt angle 240, the clamp knob 170 is rotated until the nut 220 engaged with the threaded shaft 222 of the clamp knob holds the clamp block 168 to the clamp base 166. The selected elevation angle 238 correspondingly sets a selected value of separation distance 270 from the tilt frame to a reference surface 284. The separation distance 270 corresponds approximately to a height of a bottom edge of the flat screen display above the reference surface 284 when the flat screen display is placed on the front side of the tilt frame against the display support members 124.

Because the elevation and tilt adjustments are independent of one another, the display support frame may optionally be placed in a deployed position with the elevation angle set to zero, that is, with the elevation arms remaining parallel to the base frame support members. The tilt frame may be rotated to a deployed position with the elevation arms stowed in the base frame. Similarly, the display support frame 100 may be deployed by raising the elevation arms but not the tilt panel. Deploying the elevation arms but not the tilt frame may be useful, for example, when then base frame is to be positioned against a surface that is not horizontal.

The example base frame 102 in FIGS. 3-6 are shown with levelling feet 154 attached to the extendable legs 156 and support members of the base frame 102. Casters 272 may alternatively be attached to the base frame instead of levelling feet. Examples of optional casters 272 attached to the base frame and extendable legs are shown in FIG. 4. Casters near the front ends of the left and right base frame members (108, 110) may optionally be omitted.

FIG. 4 further illustrates an alignment of the stowing aperture 210 on the tilt frame with an elevation adjustment aperture 184 on an elevation arm, showing the two apertures on a common radius 290 from the upper right rotatable joint 144. The elevation adjustment aperture 184 alignable with the stowing aperture 210 is further alignable with a pin aperture 162 in the base frame, with the elevation adjustment aperture 184 and pin aperture 162 on a common radius 292 from the lower right rotatable joint 142. When the stowing aperture, elevation adjustment aperture, and pin aperture are positioned as in the example of FIG. 4, a frame adjustment pin may engage all three apertures to hold the display support frame 100 in the flat pack configuration 276 of FIG. 2.

Figure 5:
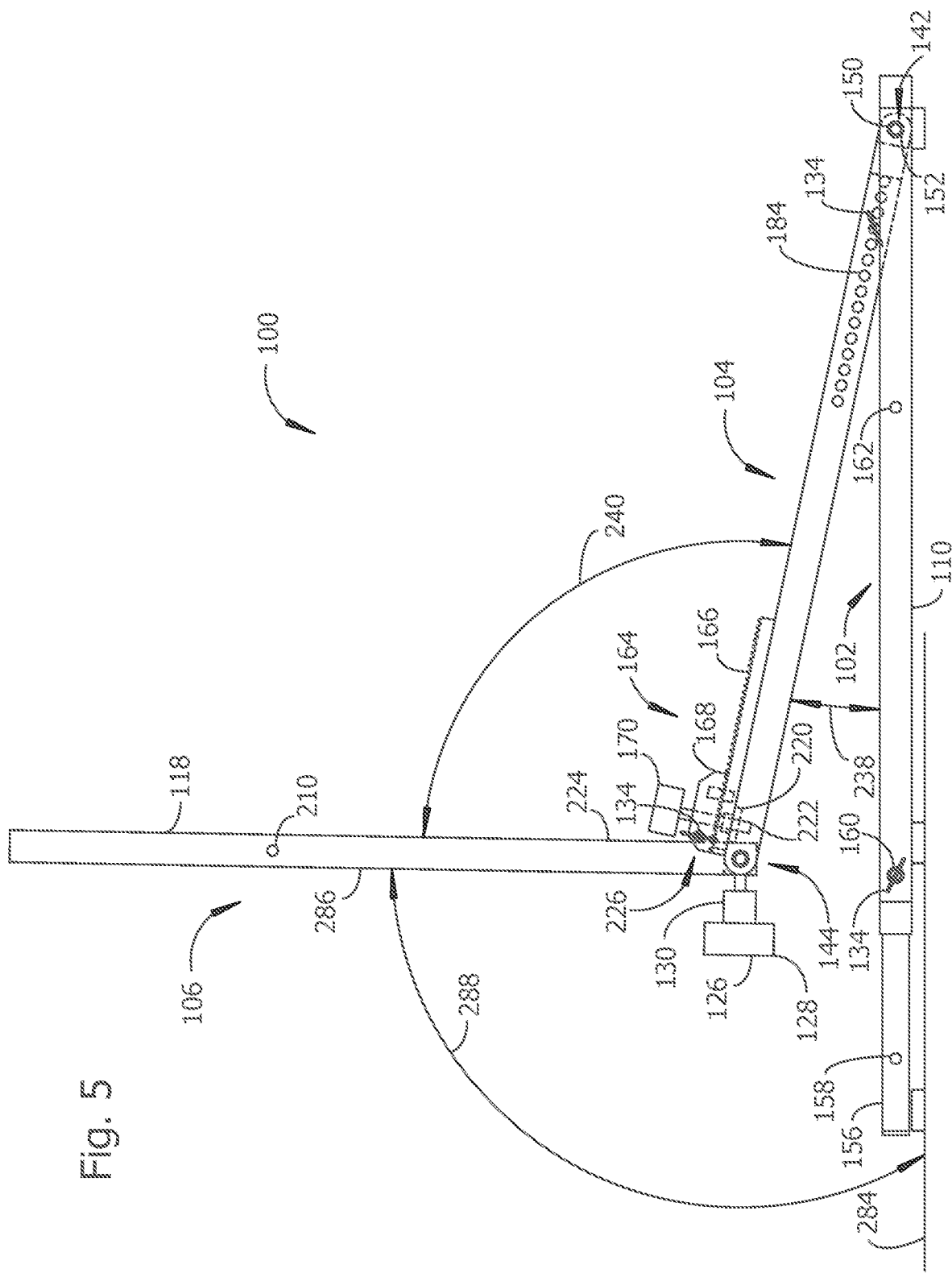
FIG. 5 shows another example of the deployed display support frame of FIGS. 1, 3, and 4, with the tilt frame positioned in a near-vertical tilt angle, and further illustrating the extendable legs in an example extended position.

FIG. 5 continues the example of FIGS. 2-4, illustrating an example position of the clamp block 168 on the clamp base 166 for placing the tilt frame 106 close to vertical with the frame adjustment pin 134 contacting the back surface 224 of the right tilt frame member 118 on the tilt frame 106. The clamp block in the example of FIG. 5 has been displaced along the clamp base 166 substantially forward of the position of the clamp block on the clamp base in FIG. 4, thereby increasing the example tilt angle 240 in FIG. 5 compared to the example tilt angle 240 FIG. 4. The disclosed embodiments of a display support frame are capable of tilt angles from zero degrees (i.e., parallel to the elevation arm) up to about 150 degrees, permitting the tilt frame 106 to lean forward past vertical when the base frame is in contact with a horizontal surface. FIG. 5 further illustrates an example of a selected viewing angle 288 between the front side of the tilt frame 106 and the reference surface 284. Parts of the clamp block 168 may extend over and end of the clamp base 166 when setting a preferred tilt angle and/or viewing angle.

Figure 6:
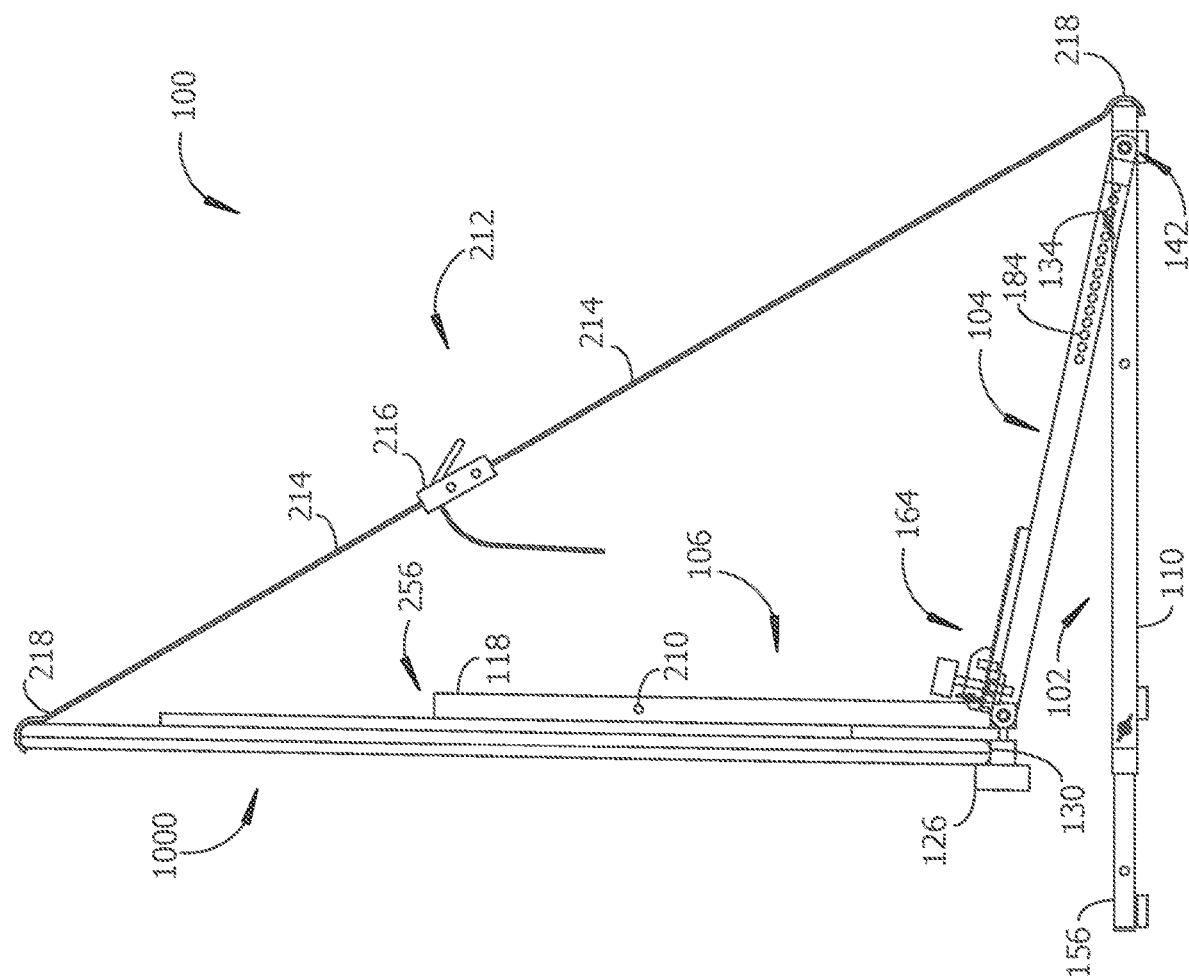
FIG. 6 shows a side view of another example of the deployed display support frame of FIGS. 1 and 3-5, illustrating an example of a flat screen display positioned on the display support frame, and further illustrating an example of an optional adjustable-length strap holding the flat screen display to the display support frame.

FIG. 6 shows a side view of an example flat screen display 1000 positioned on a display support frame 100. A bottom side of the flat screen display rests against the display support posts 126 with the tilt frame 106 tilted back somewhat from vertical. For the tilt and elevation angles shown in the example of FIG. 6, and for smaller tilt angles, the flat screen display will rest against the display support frame without being attached with threaded fasteners to the tilt frame. An optional adjustable length cam strap 212 having a hook 218 shaped for engagement with a top of the flat screen display and another hook shaped for engagement with a part of the base frame may have flat webbing straps 214 tightened with a webbing cam clamp 216 to lever the bottom of the flat screen display firmly against the display support posts and pull the flat screen display downward into firm contact with the tilt frame. When there is a possibility that a flat screen display might be subjected to impacts or vibration, for example by a person bumping into the display 1000 or display support frame 100, it may be desirable to hold the flat screen display to the display support frame with an adjustable length cam strap or attach the flat screen display to the tilt frame using the threaded mounting holes on the back of the flat screen display.

In the example of FIG. 6, the cam strap 212 extends from a top side of the monitor 100 to the rear transverse frame member 114 in the base frame 102. The lower end of the cam strap 212 may alternatively be connected to the lower transverse tilt frame member 120 or any other convenient location on the display support frame 100.

A display support frame 100 is effective for holding a flat screen display that has a vertical screen dimension substantially larger than the deployed height of the display support frame 100 at the upper end 256 of the tilt frame. When the flat screen display is so large that the VESA mounting holes on the back of the display rest above the upper end of the tilt frame, the display may still be positioned on the display support frame at tilt angles less than about 90 degrees. The optional adjustable length cam strap 212 provides quick and secure support of large flat screen displays without attaching the display to the display support frame 100 with threaded fasteners.

FIGS. 7-23 show additional details of components used with the disclosed embodiments of a display support frame 100. FIGS. 7-8 show an example of an elevation arm 104 formed from a hollow rectangular tube. The hollow rectangular tube may optionally be a hollow square tube. The example rotatable joint 142 at the back end 268 of the elevation arm includes a bushing 152 passing through a transverse hole formed in the hollow rectangular tube and a central pin 150 slidably and rotatably engaged with the bushing. The central pin will be attached at one end to a structure adjacent the elevation arm, either the base frame or the tilt frame depending on the location of the rotatable joint.

The configuration of the example rotatable joint 144 at the opposite end of the elevation arm is similar to that of the rotatable joint 142.

As shown in FIGS. 7-8, the example tilt frame rest 164 is attached to the elevation arm 104 near the front end 266 of the arm. The clamp base 166 is strongly attached to the top side 250 of the elevation arm, remaining stationary relative to the top side 250. A longitudinal slot 180 is formed through the clamp base and a corresponding elongate slot 228 is formed in top side 250 of the elevation arm, providing passage for the shank of a clamp knob to the interior void space of the hollow tube 294. A clamp knob 170 with a threaded shank 222 passes though the aligned apertures (180, 228) in the clamp base and elevation arm. The threaded shank 222 engages a nut 220 positioned inside the void space of the hollow tube 294 forming the elevation arm 104. Examples of a nut 220 include, but are not limited to, a shoulder nut, a square nut, and a hex nut. The nut 220 is preferably too large to pass through the longitudinal slot 180 in the clamp base 166 and a corresponding elongate aperture 228 formed in the elevation arm 104 when the nut is engaged with the threaded shank 222 of the clamp knob 170. Furthermore, the nut 220 is preferably small enough to pass through an access aperture 229 formed through the top side 250 of the elevation arm 104. Tightening the clamp knob 170 holds the clamp block against the clamp base. Loosening the clamp knob allows the clamp block to be moved to a position on the clamp base selected to set a preferred tilt angle of the tilt frame.

FIG. 8 further illustrates examples of alternative arrangements of elevation adjustment apertures 184. Any one or more of the elevation adjustment apertures may be formed as separate holes 184 extending all the way through both sides of the elevation arm 104. Alternatively, the spacing between adjacent holes may be selected such that adjacent holes overlap one another as suggested for elevation adjustment apertures 185. The overlapping apertures 185 provide for smaller incremental changes in values of the elevation angle 238, compared to the more widely-spaced apertures 184. An elevation arm 104 may optionally be formed with a combination of separated elevation adjustment apertures 184 and overlapping elevation adjustment apertures 185.

At least one, and optionally many, of a transverse ridge 182 are formed on the top side 253 of the clamp base 166. At least one, and optionally many, of the transverse ridge 182 are formed on a bottom side 252 of the clamp block 168. The transverse ridges 182 on the clamp block 168 engage the transverse ridges 182 on the clamp base 168 when the clamp block is placed on top of the clamp base. The intermeshed ridges strongly resist the clamp block sliding longitudinally along the clamp base when the clamp block is attached to the clamp base by the clamp knob 170 and nut 220. The clamp base 166 is optionally formed with an open end 334 to allow the nut 220, clamp block 168, and clamp knob 170 to be removed from the elevation arm by passing the nut through the access aperture 229.

FIGS. 7-8 further illustrate an example of a frame adjustment pin 134 engaged with a transverse pin aperture 172 in the clamp block 168. The smooth shank 136 of the frame adjustment pin 134 preferably extends far enough from the clamp block for the back surface of the left tilt frame member 116 and/or the right tilt frame member 118 to rest against the shank. The tilt frame resting against the shank 136 establishes the tilt angle of the tilt frame.

FIGS. 9-10 show views of an example clamp base 166. The bottom side 255 of the clamp base 166 attaches to the top side 250 of an elevation arm. The top side 253 of the clamp base 166 is formed with transverse ridges 182. An elongate aperture 180 passes all the way through the clamp base, providing passage for the clamp knob 170 through the clamp base. The elongate aperture 180 optionally passes through the back end of the clamp base to form an open end 334 for removing the clamp knob 170, clamp block 168, and nut 220.

Figure 12:
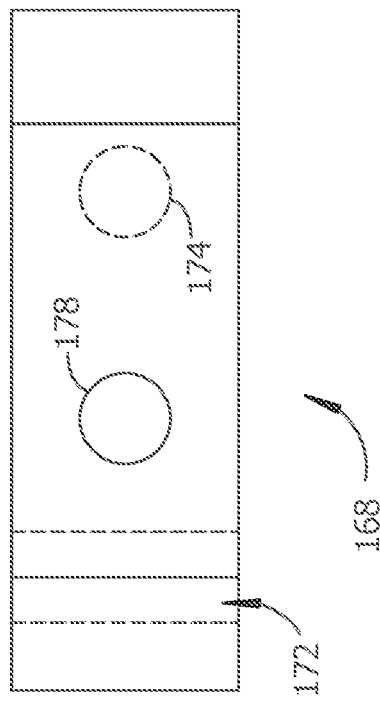
FIG. 12 is view toward the top side of the example clamp block of FIG. 11.
Figure 11:
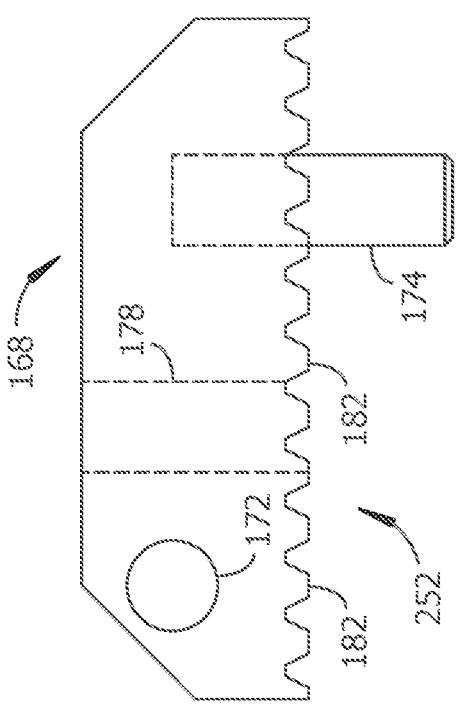
FIG. 11 is a side view of an example clamp block included with an adjustable tilt frame rest.
Figure 13:
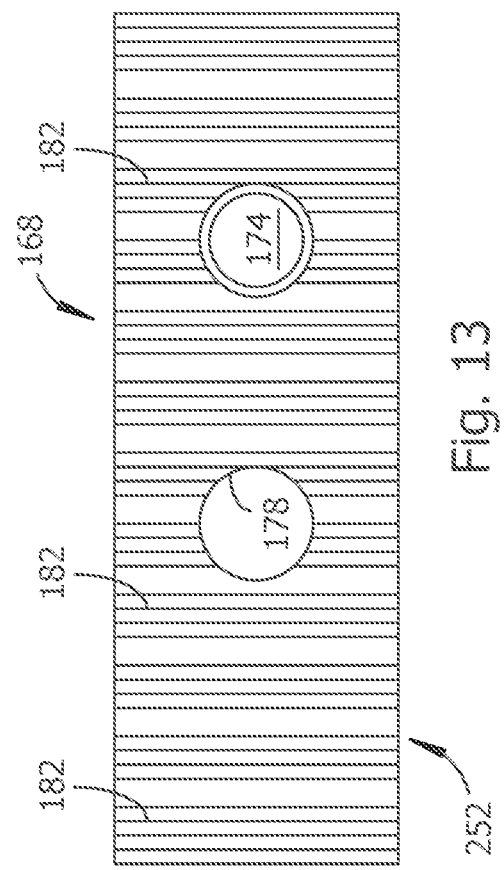
FIG. 13 is a view toward the bottom side of the clamp block of FIGS. 11-12, showing an example of transverse ridges shaped to engage corresponding transverse ridges on a clamp base.

Examples of a clamp block 168 are shown in FIGS. 11-13. At least one, and optionally many of the transverse ridge 182 formed on the top side 253 of the clamp base 166 are also formed on the bottom side 252 of the clamp block. A transverse pin aperture 172 formed through both lateral sides of the clamp block is sized to admit a frame adjustment pin with a sliding fit. A clamp knob aperture 178 passing from the top side to the bottom side 252 of the clamp block 168 is sized for a clearance fit of the threaded shank 222 of the clamp knob 170. A guide pin 174 extends outward from the bottom side 252 of the clamp block. The guide pin is positioned to slidably engage with the elongate aperture 180 formed in the clamp base. The guide pin 174 resists lateral displacement of the clamp block from the clamp base.

Figure 14:
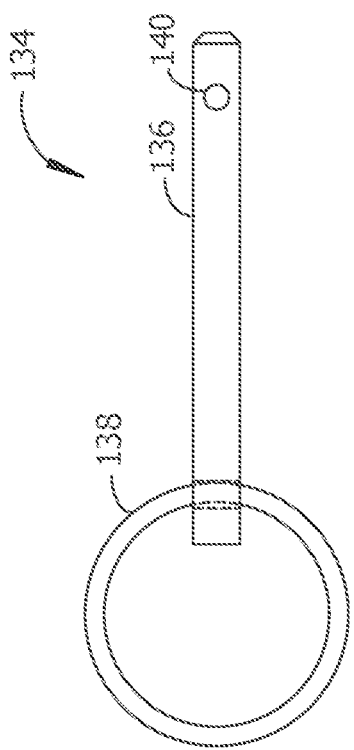
FIG. 14 is a side view of an example frame adjustment pin suitable for use with a display support frame.
Figure 15:
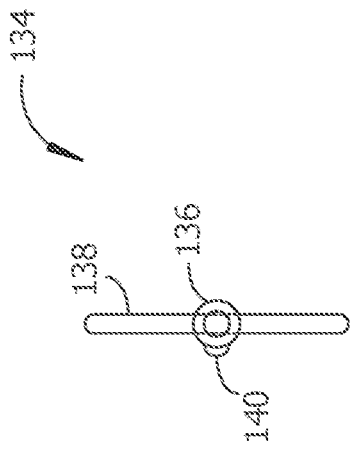
FIG. 15 is an end view of the example frame adjustment pin of FIG. 14.

An example of a frame adjustment pin 134 is shown in FIG. 14 and FIG. 15. A frame adjustment pin may alternatively be referred to as a hitch pin. Frame adjustment pins are included with embodiments of the display support frame 100 to set the tilt angle 240, elevation angle 238, and the selected position of the extendable legs 156. The frame adjustment pin 134 includes a smooth, hardened, rigid shank 136. An optional ring-shaped finger pull 138 is attached to an end of the shank. An optional spring-loaded ball detent 140 may be included near an end of the shank 136 opposite the finger pull 138.

Figure 16:
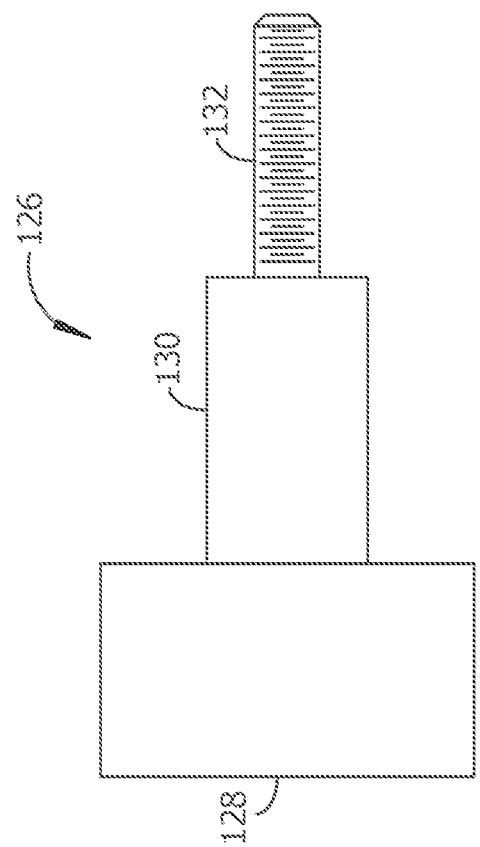
FIG. 16 is a side view of an example display support post configured for supporting a flat screen display on a tilt frame.
Figure 17:
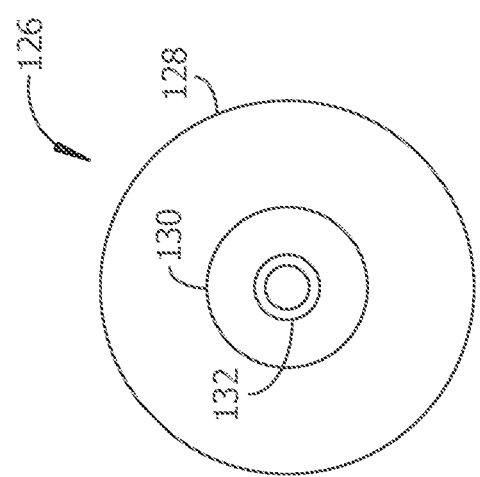
FIG. 17 is an end view of the example display support post of FIG. 16.
Figure 18:
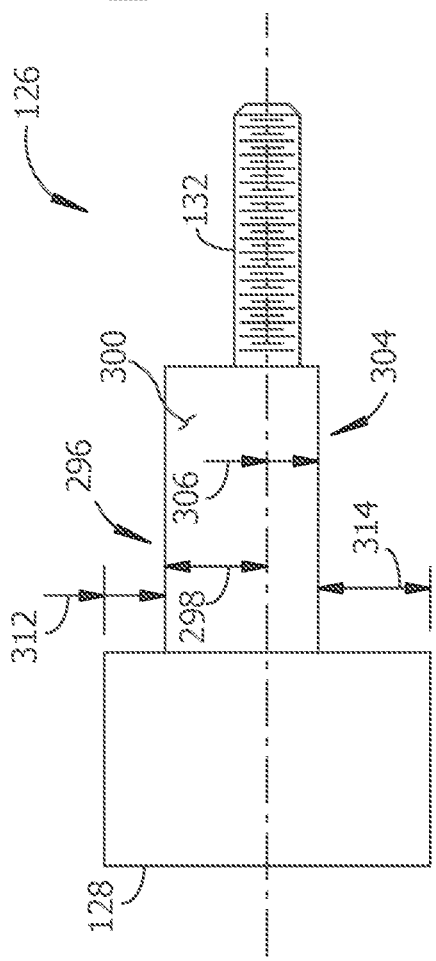
FIG. 18 is a side view of an alternative embodiment of a display support post having more than one display support surface for supporting the bezel of a flat screen display without the knob of the display support post blocking the alphanumeric and/or graphics display area of the flat screen display.
Figure 19:
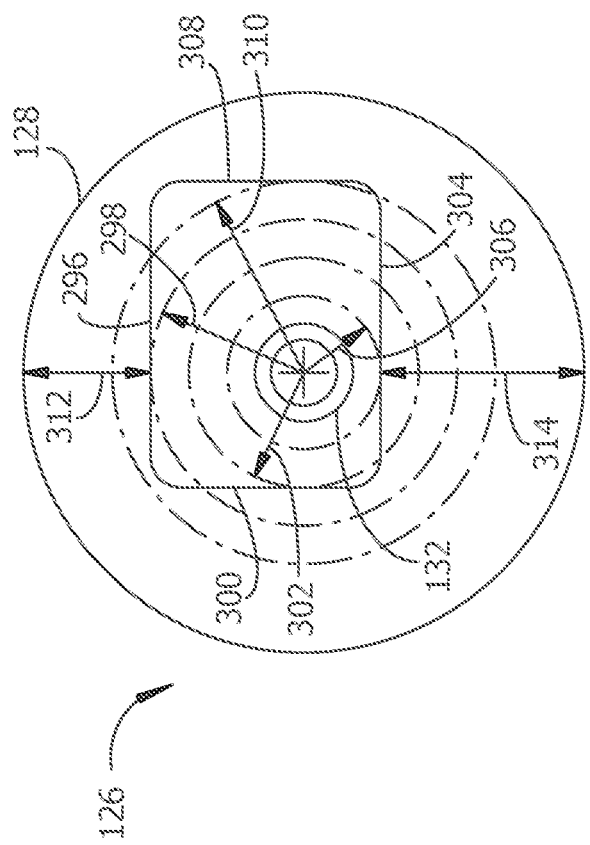
FIG. 19 is an end view of the example display support post of FIG. 18, showing examples of four display support surfaces at different distances from the outer edge of the knob.
Figure 22:
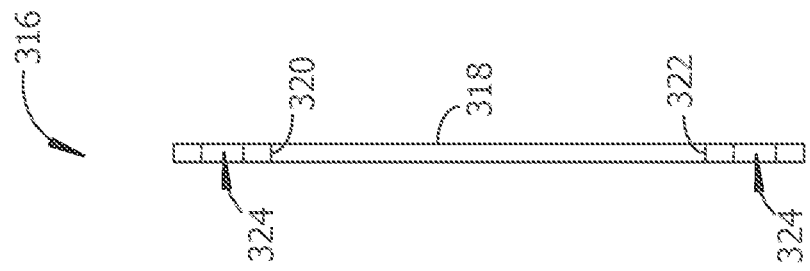
FIG. 22 is a view toward a front edge of a bracket plate of the tilt frame safety bracket of FIG. 21.
Figure 21:
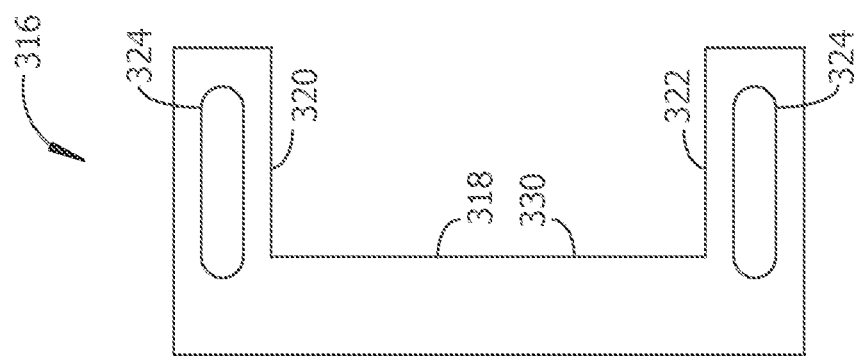
FIG. 21 is a view toward a side of an example tilt frame safety bracket.

An example of a display support post 126 is shown in FIG. 16 and FIG. 17. Display support posts threadably engage with the tilt frame 106 near the lower end 254 of the tilt frame. The example display support post 126 includes a knob 128 providing a hand grip, a support surface 130 attached to the knob, and a threaded shank 132 attached to the knob. A flat screen display supported by the display support frame 100 may optionally be positioned to rest against the support surface of the display support post, as shown for example in FIG. 6.

The example display support post 126 of FIGS. 16-17 includes a knob, support surface, and threaded shank which are approximately concentric with one another. The outer perimeter of the knob 128 extends about the same distance over the bezel of a flat screen display resting against the support surface 130 no matter the rotation angle of the display support post. The alternative display support post example of FIGS. 18-19 includes more than one support surface, each surface at a different distance from the outer peripheral edge of the knob. For example, a flat first display support surface 296 is formed tangent to a first radial distance 298 from the threaded shank 132. A flat second display support surface 300 is formed tangent to a second radial distance 302. An optional flat third display support surface 304 is formed tangent to a third radial distance 306. An optional flat fourth display support surface 308 is formed tangent to a fourth radial distance 310. A radial distance 312 from an outer peripheral edge of the knob 128 to the first display support surface 296 is different from another radial distance 314 from the outer peripheral edge of the knob to the third display support surface. Each display support surface preferably has a radial distance to the edge of the knob different from the other display support surfaces. The knob may be rotated to select which display support surface a flat screen display rests against to prevent the knob from covering part of the viewable area of the display. Outer surfaces of the knob are optionally coated with a polymer material that provides a non-slip and/or cushioned hand grip.

A display support frame 100 optionally includes a tilt frame safety bracket 316 to prevent the tilt frame from rotating forward if the tilt frame is bumped or pushed accidentally. Examples of a tilt frame safety bracket are shown in FIGS. 20-23. FIG. 20 shows a partial side view of toward the elevation arm 104 and inboard surface 332 of the left tilt frame member 116 with other parts of the tilt fame omitted in the figure. The lower transverse tilt frame member 120 and upper transverse tilt frame member 122 are shown in cross section for reference. As suggested in the examples of FIGS. 21-22, the example tilt frame safety bracket includes a bracket plate 318 having a front edge 330. An upper bracket arm 320 extends away from the front edge 330 at an upper end of the bracket plate. A lower bracket arm 322 extends away from the front edge at a lower end of the bracket plate. An arm slot 324 is formed in each of the upper and lower bracket arms. As suggested in FIG. 20, two bracket fasteners 326 pass through the arm slots 324 and attach to the inboard surface 332 of the left tilt frame member 116. The bracket fasteners 326 are preferably not so tight as to prevent the tilt frame safety bracket from sliding against the bracket fasteners to the ends of the arm slots.

The end of the frame adjustment pin 134 extending from the clamp block 168 also extends through a pin slot 328 formed between the front edge 330 of the bracket plate 318 of the tilt frame safety bracket 316 and the back edge of the left tilt frame member 116. Contact between the shank 136 of the frame adjustment pin 134 and the front edge 330 of the bracket plate 318 limits rotation of the tilt frame toward the front of the tilt base. Contact between the shank 136 of the frame adjustment pin and a back edge of the tilt frame, for example the back edge 225 of the left tilt frame member 116, limits rotation of the tilt frame toward the back of the tilt base. The length of the pin slot 328 and arm slots 324 are preferably selected to permit the pin to remain engaged in the pin slot over the full range of the tilt angle 240 (ref. FIG. 5).

Figure 23:
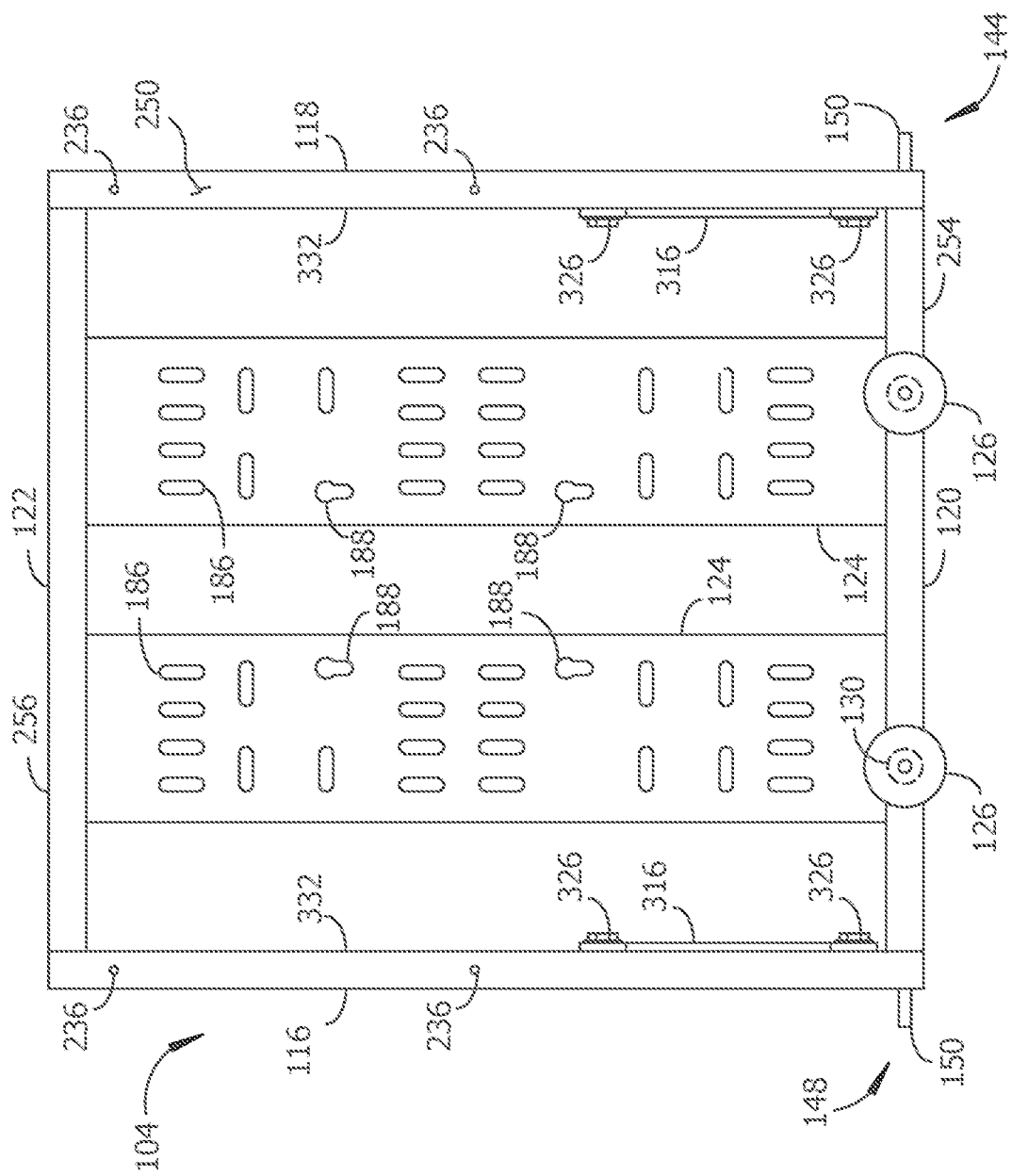
FIG. 23 is a view toward a front side of an example tilt frame having an optional first tilt frame safety bracket attached to the inboard surface of the left tilt frame member and an optional second tilt frame safety bracket attached to the inboard surface of the right tilt frame member.

As suggested in the example of FIG. 23, a first tilt frame safety bracket 316 may be attached by bracket fasteners 326 to the inboard surface 332 of the left tilt frame member 116. A second tilt frame safety bracket 316 may optionally be attached by bracket fasteners 326 to the inboard surface 332 of the right tilt frame member 118.

It may be desirable to place on a display support frame 100 a flat screen display having attached channels or arms configured for attachment to a wall mount plate without removing the channels from the flat screen display. A wall mounting plate may be attached to the tilt frame 106 of the display support frame as shown in the example of FIG. 24. The elevation arms 104 and tilt frame 106 may be set to preferred elevation and tilt angles as previously described. The channels or arms attached to the flat screen display (monitor and attached arms not shown in channels or arms on the back of the flat screen display may be suspended from or clamped to flanges 234 on the example VESA wall mount 190. A wall mount 190 will generally include apertures 230 through which fasteners may be passed and attached to a support structure, in this case the display support frame 100. The wall mount 190 may be attached with threaded fasteners 232 to threaded holes 236 formed in the tilt frame members (116, 118) or alternately to apertures formed in the display support member(s) 124 (ref. FIG. 1).

Figure 27:
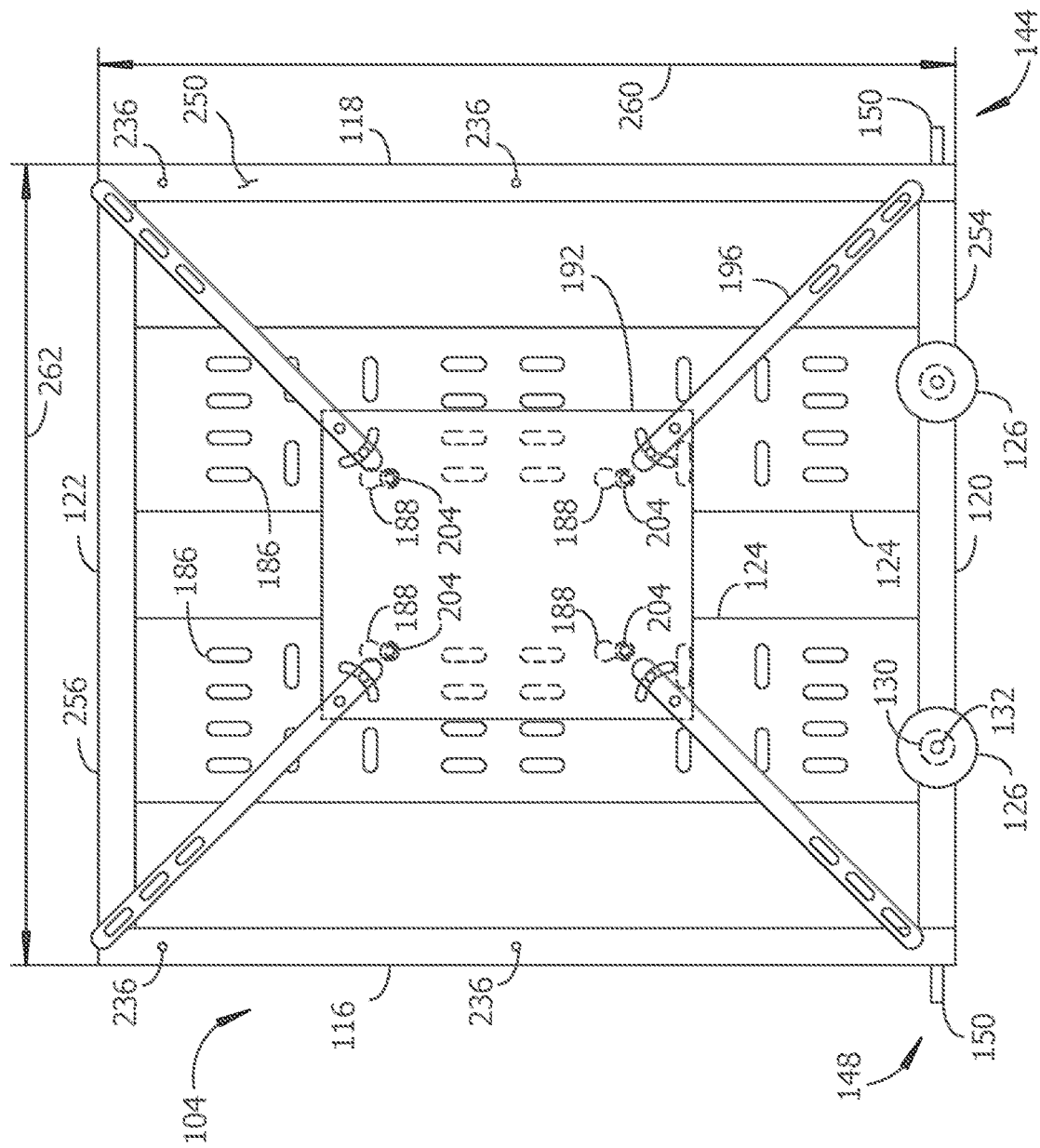
FIG. 27 is a pictorial view of the quick-connect adapter of FIGS. 25-26 attached to the front side of the example tilt frame of FIG. 1.

The quick-connect display adapter 192 in the examples of FIGS. 25-27 enable a flat screen display to be easily attached to and detached from a display support frame 100. Optionally provided as an accessory for use with a display support frame 100, the quick-connect display attaches securely to the mounting holes on the back side of a flat screen display. Capped posts 204 extending outward from an adapter plate 194 are positioned to engage with keyhole apertures 188 in a display support member 124 of the tilt frame. Examples of keyhole apertures 188 are shown in FIG. 1, FIG. 23, and FIG. 27. The display support members are optionally formed with more than four keyhole apertures 188 to enable connection of the quick-connect display adapter 192 at different positions on the tilt frame. In some embodiments the capped posts 204 are welded to the adapter plate. Capped posts 204 may alternately be implemented as threaded fasteners, for example hex head bolts or socket head cap screws.

A quick-connect display adapter 192 optionally includes four swing arms 196 rotatably coupled to the adapter plate 194 by a swing arm pin 202 attached to each swing arm. The swing arms are rotatable to enable alignment of mounting apertures 208 with threaded mounting holes on flat screen displays of different sizes and mounting hole patterns. Each swing arm pin 202 is rotatably engaged with a corresponding pin aperture 274 in the adapter plate. A guide pin 200 attached to each swing arm 196 moves in an arcuate aperture 198 formed in the adapter plate 194 near each pin aperture 274. Panel mounting apertures 208 may be aligned with threaded apertures on the back side of a flat screen display and threaded fasteners passed through the panel mounting apertures 208 into the threaded apertures to attach the flat screen display to the swing arms. FIG. 27 shows an example of the capped posts 204 on a quick-connect display adapter engaged with keyhole apertures 188 on a tilt frame 106. FIG. 27 omits other parts of the display support frame 100 and the flat screen display to more clearly show details of the attachment between the quick-connect adapter 192 and tilt frame.

Unless expressly stated otherwise herein, ordinary terms have their corresponding ordinary meanings within the respective contexts of their presentations, and ordinary terms of art have their corresponding regular meanings.

What is claimed is:
1. An apparatus, comprising:
   a base frame;
   a tilt frame;
   a first elevation arm;
   a tilt frame rest attached to said first elevation arm;
   a second elevation arm;
   a lower right rotatable joint rotatably coupling a back end of said first elevation arm to said base frame;
   an upper right rotatable joint rotatably coupling a front end of said first elevation arm to a lower end of said tilt frame;
   a lower left rotatable joint rotatably coupling a back end of said second elevation arm to said base frame;
   an upper left rotatable joint rotatably coupling a front end of said second elevation arm to said lower end of said tilt frame; and
   said tilt frame rest comprises:
   a clamp base formed with an elongate aperture and a plurality of transverse ridges formed on a top side of said clamp base;
   a clamp block formed with a plurality of transverse ridges on a bottom side of said clamp block, a clamp knob aperture extending from a top side of said clamp block to said bottom side of said clamp block, and a transverse pin aperture;

a guide pin attached to said clamp block, said guide pin extending outward from said bottom side of said clamp block, and said guide pin positioned to engage said elongate aperture in said clamp base;

a frame adjustment pin slidably engaged with said transverse pin aperture, an end of said frame adjustment pin extending transversely toward said tilt frame; and a clamp knob passing through said clamp knob aperture, through said elongate aperture in said clamp base, and engaged with a nut positioned beneath said clamp base.

2. The apparatus of claim 1, wherein said base frame comprises a left base frame member, a right base frame member, a front transverse base frame member joined to said left base frame member and said right base frame member, and a rear transverse base frame member joined to said left base frame member and said right base frame member.

3. The apparatus of claim 2, wherein said lower right rotatable joint is attached to said right base frame member near said rear transverse base frame member and said lower left rotatable joint is attached to said left base frame member near said rear transverse base frame member.

4. The apparatus of claim 2, further comprising:
a first extendable leg slidably engaged with said left base frame member at a front end of said base frame; and
a second extendable leg slidably engaged with said right base frame member at said front end of said base frame, wherein said left base frame member and said right base frame member are formed as hollow tubes.

5. The apparatus of claim 1, wherein said clamp block is positionable along said clamp base with said plurality of transverse ridges on said top side of said clamp base engaged with said plurality of transverse ridges on said bottom side of said clamp block.

6. The apparatus of claim 1, wherein a tilt angle of said tilt frame relative to said first elevation arm is established by said tilt frame in contact with said frame adjustment pin.

7. The apparatus of claim 1, further comprising a plurality of transverse elevation adjustment apertures formed through said first elevation arm near said back end of said first elevation arm.

8. The apparatus of claim 7, wherein said frame adjustment pin in said tilt frame rest is a first frame adjustment pin, and further comprising a second frame adjustment pin slidably engaged with a selected one of said transverse elevation adjustment apertures formed in said first elevation arm.

9. The apparatus of claim 8, wherein an elevation angle of said first elevation arm relative to said base frame is established by said second frame adjustment pin in contact with a top side of said base frame.

10. The apparatus of claim 1, wherein said tilt frame comprises an upper transverse tilt frame member, a left tilt frame member joined to an end of said upper transverse tilt frame member, a right tilt frame member joined to an opposite end of said upper transverse tilt frame member, and a lower transverse tilt frame member joined to said left tilt frame member and said right tilt frame member.

11. The apparatus of claim 10, wherein said upper right rotatable joint couples to said right tilt frame member near said lower transverse tilt frame member and said upper left rotatable joint couples to said tilt frame member near said lower transverse tilt frame member.

12. The apparatus of claim 10, further comprising two of a display support posts threadably engaged with said lower transverse tilt frame member.

13. The apparatus of claim 10, wherein said tilt frame further comprises a display support member attached to said upper transverse tilt frame member and said lower transverse tilt frame member.

14. The apparatus of claim 13, wherein said display support member is formed with a plurality of fastener apertures positioned to align with a VESA mounting hole pattern on a flat screen display.

15. The apparatus of claim 13, wherein said display support member is formed with at least two keyhole apertures.

16. The apparatus of claim 13, wherein said display support member is a first display support member, and further comprising a second display support member attached to said upper transverse tilt frame member and said lower transverse tilt frame member.

17. The apparatus of claim 1, wherein said tilt frame rest attached to said first elevation arm is a first tilt frame rest, and further comprising a second tilt frame rest attached to said second elevation arm.

18. The apparatus of claim 1, further comprising a stowed position of said apparatus having a second frame adjustment pin passing through a pin aperture formed in said base frame, through an elevation adjustment aperture formed in said first elevation arm, and through a stowing aperture formed in said tilt frame.

* * * * *